US009516515B2

(12) United States Patent
Ohta et al.

(10) Patent No.: US 9,516,515 B2
(45) Date of Patent: Dec. 6, 2016

(54) COMMUNICATION DURATION CONFIGURING METHOD, RELAY STATION, BASE STATION, AND MOBILE COMMUNICATION SYSTEM

(75) Inventors: Yoshiaki Ohta, Yokohama (JP); Yoshihiro Kawasaki, Yokosuka (JP); Katsumasa Sugiyama, Kawasaki (JP); Yoshiharu Tajima, Yokohama (JP); Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 266 days.

(21) Appl. No.: 13/607,042

(22) Filed: Sep. 7, 2012

(65) Prior Publication Data
US 2013/0242771 A1 Sep. 19, 2013

Related U.S. Application Data

(63) Continuation of application No. PCT/JP2010/001776, filed on Mar. 12, 2010.

(51) Int. Cl.
H04W 24/02 (2009.01)
H04B 7/155 (2006.01)
H04W 16/26 (2009.01)
H04W 84/04 (2009.01)

(52) U.S. Cl.
CPC ......... *H04W 24/02* (2013.01); *H04B 7/15585* (2013.01); *H04W 16/26* (2013.01); *H04W 84/047* (2013.01)

(58) Field of Classification Search
None
See application file for complete search history.

(56) References Cited

U.S. PATENT DOCUMENTS

2012/0250526 A1* 10/2012 Zhao et al. ........... 370/243

FOREIGN PATENT DOCUMENTS

JP 10-313271 11/1998
JP 2009-267477 11/2009

OTHER PUBLICATIONS

3GPP TR 36.806 V2.0.0; 3rd Generation Partnership Project; Technical Specification Group Radio Access Network; Evolved Universal Terrestrial Radio Access (E-UTRA); "Relay architectures for E-UTRA (LTE-Advanced) (Release 9)"; Feb. 2010.
3GPP TR 36.913 V8.0.1; 3rd Generation Partnership Project; Technical Specification Group Radio Access Network; "Requirements for further advancements for Evolved Universal Terrestrial Radio Access (E-UTRA) (LTE-Advanced) (Release 8)"; Mar. 2009.
ETSI TR 136 912 V9.0.0; LTE; "Feasibility study for Further Advancements for E-UTRA (LTE-Advanced) (3GPP TR 36.912 version 9.0.0 Release 9)"; Sep. 2009.

(Continued)

Primary Examiner — Rhonda Murphy
(74) Attorney, Agent, or Firm — Myers Wolin, LLC

(57) ABSTRACT

A communication duration configuring method is used in a mobile communication system with a relay station for relaying wireless communications between a base station and a mobile station. The method includes: configuring at least one of a downlink communication duration in which the relay station receives a transmission signal from the base station while limiting a transmission of a signal from the relay station to the mobile station, and an uplink communication duration in which the relay station transmits the transmission signal to the base station while limiting a transmission of a signal from the mobile station to the relay station; measuring a self-interference amount in the relay station; and controlling a configuration of the communication duration according to the self-interference amount.

11 Claims, 23 Drawing Sheets

(56) References Cited

OTHER PUBLICATIONS

NTT DoCoMo; "Type 1 Relay definition"; 3GPP TSG-RAN Meeting #60; R1-101281; San Francisco, USA; Feb. 22-26, 2010.

International preliminary report on patentability with forms PCT/IB/326 and PCT/IB/338 issued for International Patent Application No. PCT/JP2010/001776, mailed Sep. 27, 2012.
International search report issued for corresponding International Patent Application No. PCT/JP2010/001776, mailed Jun. 1, 2010.

* cited by examiner

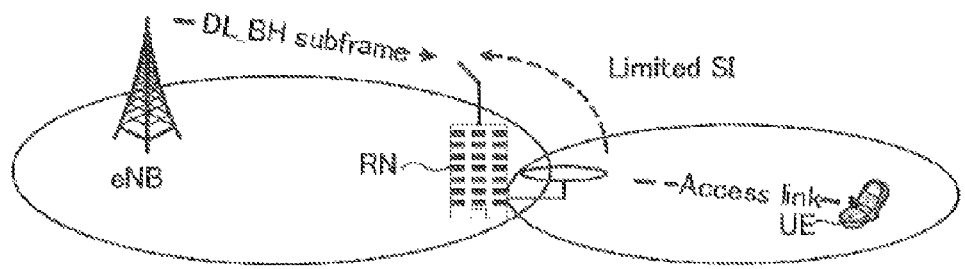
F I G. 4 A

F I G. 1 0   RELATED ART

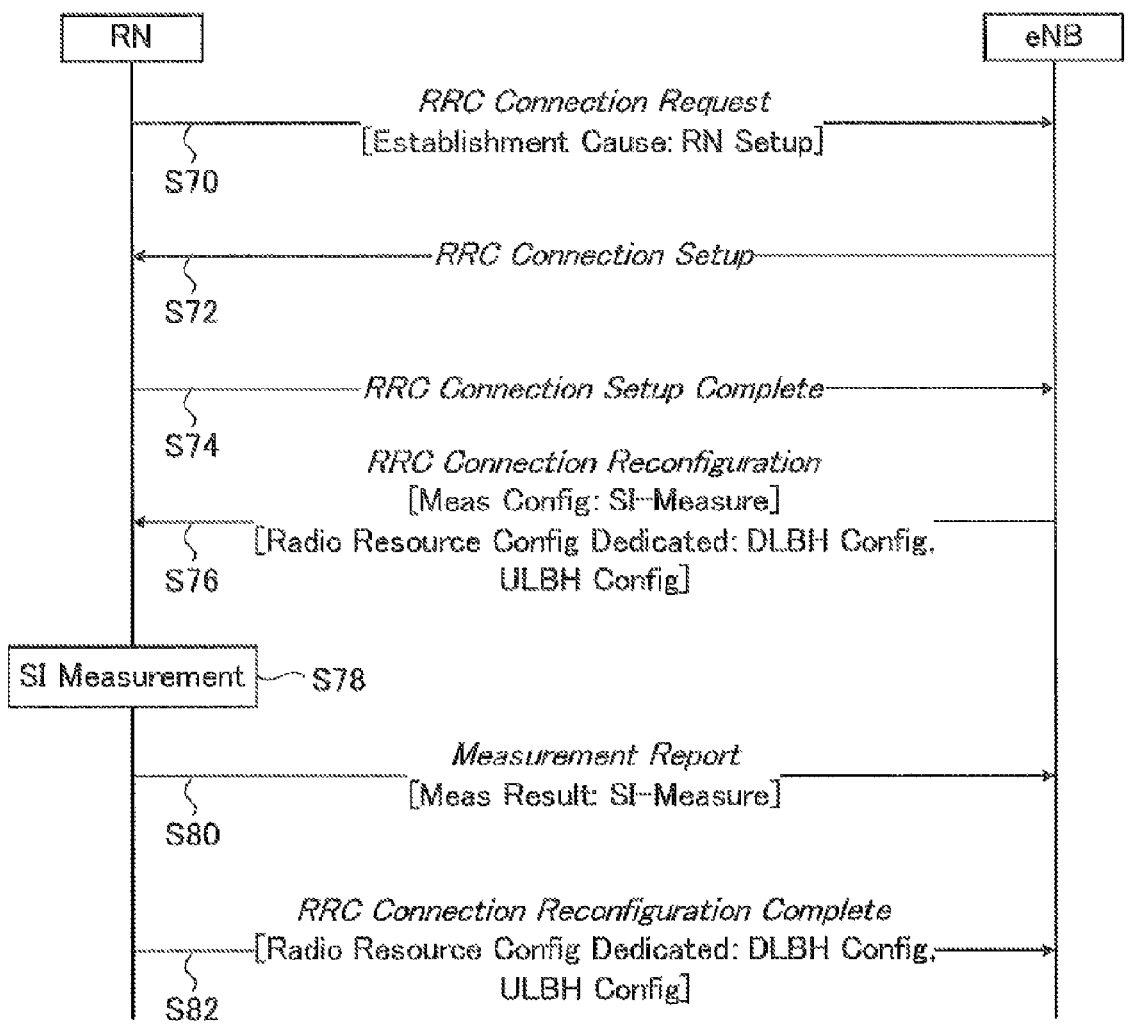
F I G. 1 4

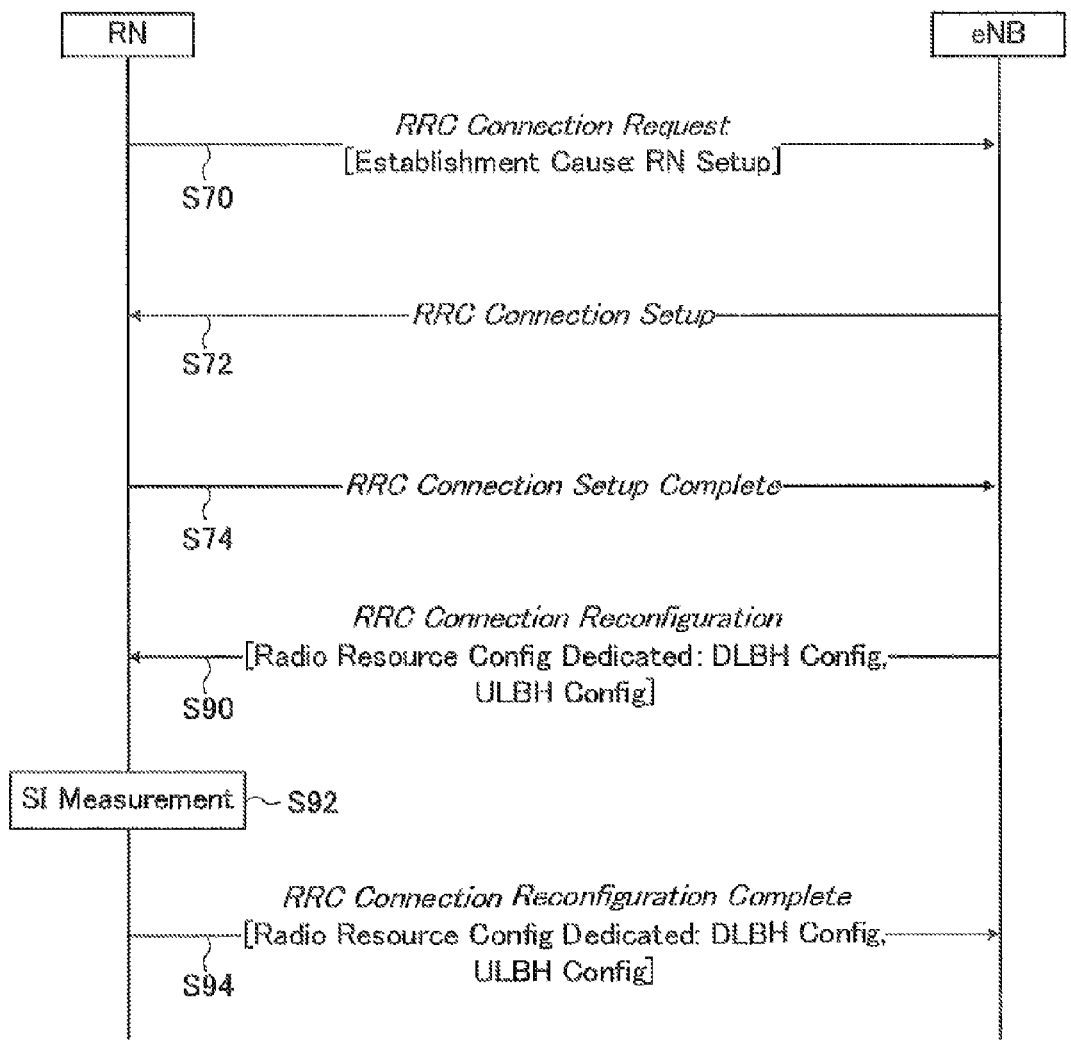
F I G. 1 5

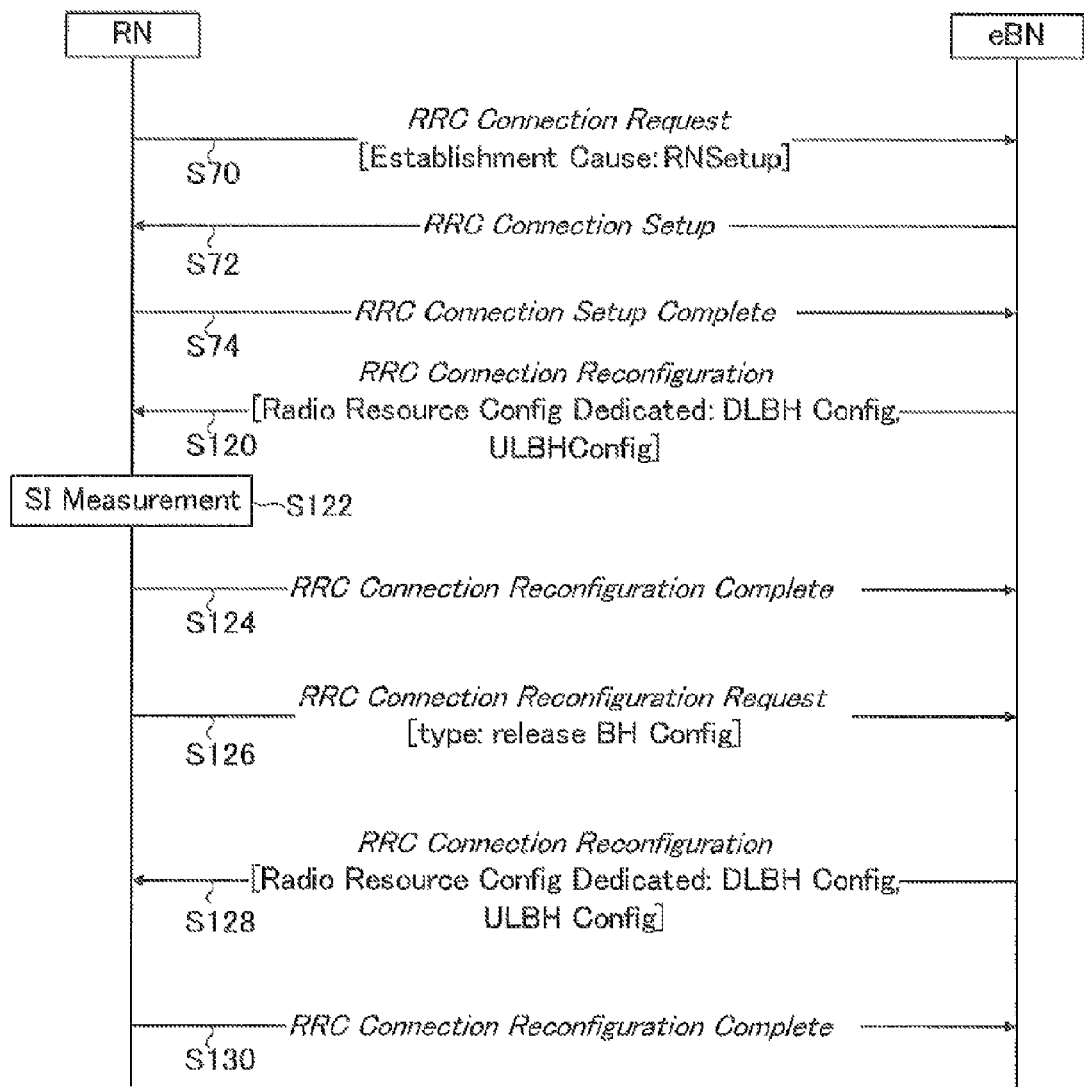
F I G. 1 7

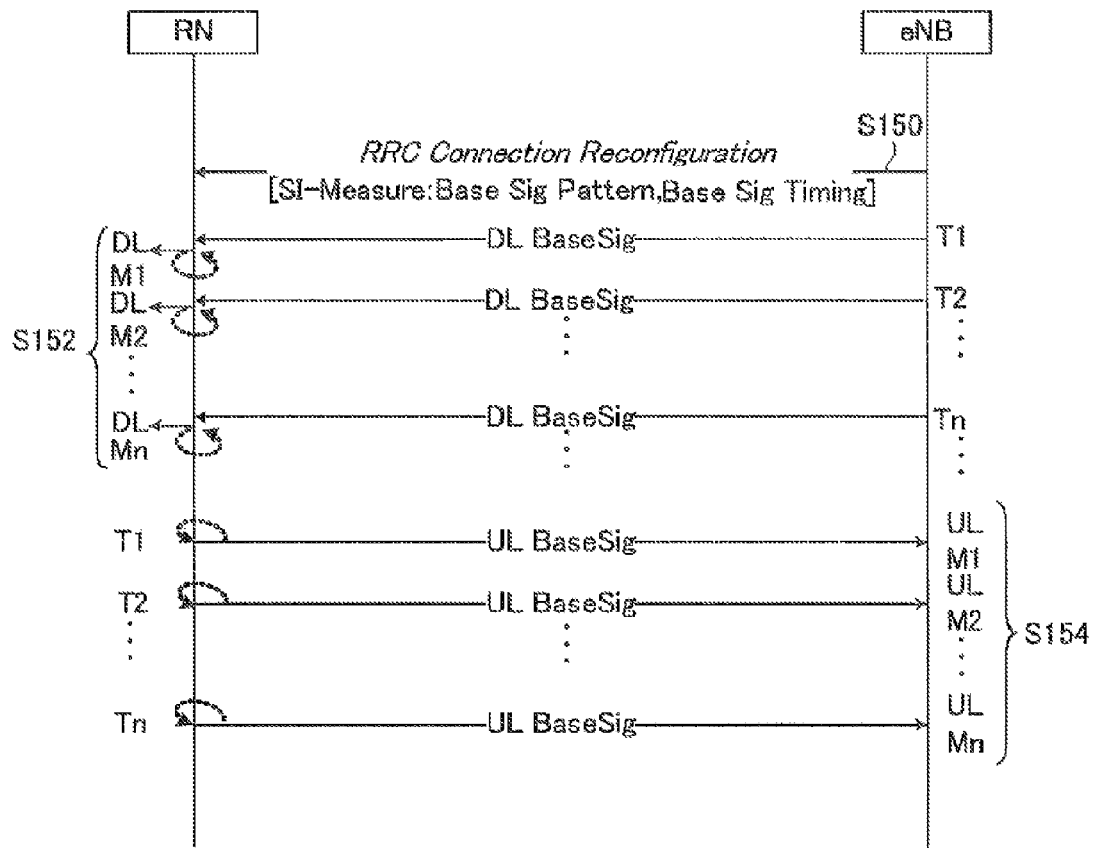
F I G. 19

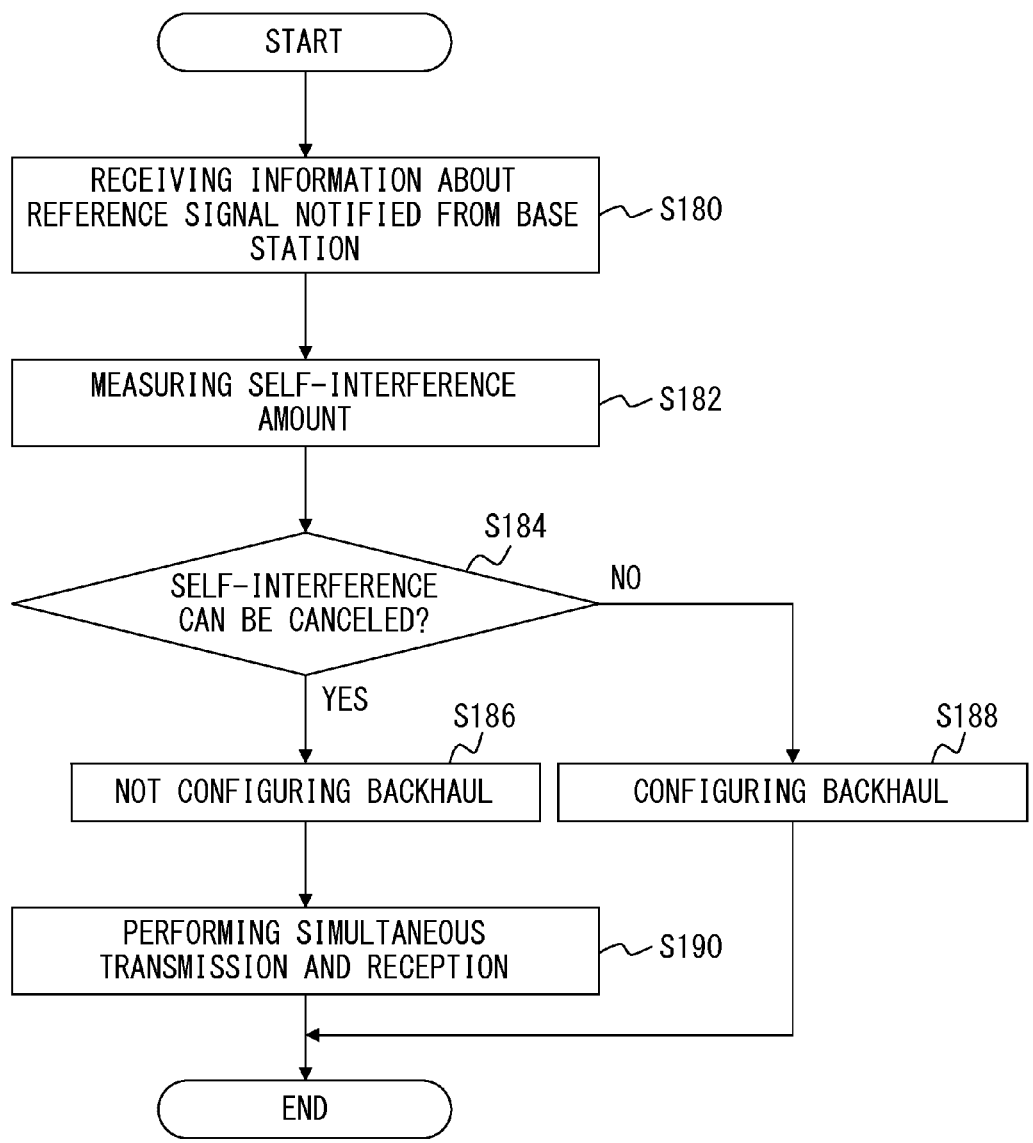
F I G. 23

COMMUNICATION DURATION CONFIGURING METHOD, RELAY STATION, BASE STATION, AND MOBILE COMMUNICATION SYSTEM

CROSS-REFERENCE TO RELATED APPLICATION

This application is a continuation application of International Application PCT/JP2010/001776 filed on Mar. 12, 2010 and designated the U.S., the entire contents of which are incorporated herein by reference.

FIELD

The embodiments described herein are related to a relay technology of a wireless communication between a base station and a mobile station.

BACKGROUND

In a cellular mobile communication system, an evolution from a UMTS (universal mobile telecommunication system) to an LTE (long term evolution) has been devised. In the LTE, an OFDM (orthogonal frequency division multiplexing) and an SC-FDMA (single carrier-frequency division multiple access) are adopted respectively as downlink and uplink radio access technology, thereby enabling a high-speed radio packet communication to be performed at 100 Mb/s or higher for a downlink peak transmission rate and 50 Mb/s or higher for an uplink peak transmission rate. In the 3GPP (3rd Generation Partnership Project) as an international standardization organization, a study of a mobile communication system LTE-A (LTE-Advanced) based on the LTE has been started to realize a further high-speed communication. In the LTE-A, the downlink peak transmission rate of 1 Gb/s and the uplink peak transmission rate of 500 Mb/s are aimed at, and various new techniques are studied on a radio access system, a network architecture, etc. (non-patent documents 1-3). Note that, since the LTE-A is based on the LTE, it is devised to maintain backward compatibility.

Non-Patent Document 1:
3GPP TR 36.913 V8.0.1 (2009-03), 3rd Generation Partnership Project; Technical Specification Group Radio Access Network; Requirements for further advancements for Evolved Universal Terrestrial Radio Access (E-UTRA) (LTE-Advanced) (Release 8)

Non-Patent Document 2:
3GPP TR 36.912 V9.0.0 (2009), 3rd Generation Partnership Project; Technical Specification Group Radio Access Network; Feasibility study for Further Advancements for E-UTRA (LTE-Advanced) (Release 9)

Non-Patent Document 3:
3GPP TR 36.806 V2.0.0 (2010-02), 3rd Generation Partnership Project; Technical Specification Group Radio Access Network; Evolved Universal Terrestrial Radio Access (E-UTRA); Relay architectures for E-UTRA (LTE-Advanced) (Release 9)

As one of the methods for establishing a high-speed data communication, the method of deploying a relay station (relay node (RN)) as illustrated in FIG. 1 to support the communication between a base station and a mobile station (non-patent document 2). The relay station relays the communication between a base station (Doner eNB or eNB) and a mobile station (user equipment (UE)), and is provided to support a high-speed data communication. As illustrated in FIG. 2, the link between the mobile station UE and the relay station RN is referred to as a Uu, and the link between the base station (eNB) and the relay station (RN) is referred to as a Un. In the following explanation, the Uu may be referred to as an access link, and the Un may be referred to as a backhaul link.

Various schemes can be implemented to embody a relay station, but for example, a repeater scheme, a decode and forward scheme, an L2 scheme, and an L3 scheme have been studied. The relay station in the repeater scheme has only the function of amplifying a radio signal (data signal and noise). The relay station in the decode and forward scheme has the function of amplifying only a data signal in the radio signal. The relay station in the L2 scheme has the function of the L2 such as a MAC layer etc. The relay station in the L3 scheme has the function of the L3 such as an RRC layer etc., and functions like a base station. The relay station in the L3 scheme is referred to as a Type1 RN in the LTE-A.

A method of evolving a relay station in to a cell is also studied. For example, a method of evolving a relay station to be provided at a cell edge to increase the throughput of the cell edge, a method of evolving a relay station to be provided in a range where radio waves do not reach from the base station locally in a cell (dead spot), etc. are studied.

When data is transmitted between the base station and the mobile station through the relay station (Type1 RN) of the L3 scheme, it is preferable that no self-interference is generated in the relay station in inband relaying in which the same frequency band is shared between the base station and the relay station, and between the relay station and the mobile station. The self-interference (or also called "loop interference") refers to interference occurring when the relay station receives DL data from the base station to the relay station and simultaneously transmits DL data to the mobile station, and the transmission data appears in a receiver of the relay station, thereby generating interference with the data from the base station. Likewise with the UL data, there can occur the self-interference. When the self-interference occurs, the relay station cannot correctly receive data.

To overcome the problem of the self-interference, the following policies are studied for LTE-A (non-patent document 2).

(A) Downlink: The relay station does not transmit data to the mobile station in the DL backhaul as a subframe for receiving data from an upper base station.

(B) Uplink: The relay station does not receive data from the mobile station in the UL backhaul as a subframe for transmitting data to an upper base station.

Based on the policy (A) above, as illustrated in FIG. 3, when the DL backhaul is configured between the relay station and the base station, the subframe between the relay station and the mobile station is configured as an MBSFN (multicast/broadcast over single frequency network) subframe because, in the MBSFN subframe, the mobile station for the LTE does not receive unicast data. Therefore, since the mobile station UE does not receive a part of a reference signal, it is preferable because it is not necessary to make an unnecessary measurement of the reference signal in the mobile station. That is to say, the relay station can transmit a PDCCH (physical downlink control channel), a PHICH (physical hybrid ARQ indicator channel), a PCFICH (physical control format indicator channel) while it cannot transmit a PDSCH. To receive the control signal, a reference signal is arranged in the first half (CTRL duration illustrated in FIG. 3) of the MBSFN subframe, but it is not arranged in the last half of the MBSFN subframe.

Based on the policy (B) above, control is performed in the relay station not to grant the mobile station permission to transmit UL data before 4 subframes (4 ms) in the UL backhaul because if the mobile station is granted the permission to transmit UL data before 4 ms in the UL backhaul, the mobile station transmits data to the relay station in the UL backhaul, which is to be avoided.

Furthermore, in the relay station, control is performed not to transmit DL data to the mobile station before 4 subframes (4 ms) in the UL backhaul for the following reason. That is, in the HARQ (hybrid automatic repeat request) of the LTE, it is regulated that a receiving station is to return an ACK/NACK signal in 4 ms (4 subframes) after a transmitting station transmits data. Therefore, if DL data is transmitted to the mobile station in 4 ms in the UL backhaul, the mobile station transmits the ACK/NACK signal to the relay station in the UL backhaul, which is to be avoided.

In the UL backhaul, a PUCCH (physical uplink control channel) and a PUSCH (physical uplink shared channel) as control signals to the relay station can be transmitted, but the PUCCH and the PUSCH as control signals from the mobile station cannot be transmitted.

In the actual mobile communication system, there is the situation in which a relay station can cancel the self-interference. This situation is exemplified in FIGS. 4A and 4B.

FIG. 4A illustrates the situation in which, for example, a relay station RN is arranged at the edge of a cell coverage of a base station eNB, and the relay station RN communicates with a mobile station UE outside the cell coverage. In this situation, when the relay station RN transmits data on an access link, the amount of self-interference in the receiver of the relay station RN is limited (limited SI (self-interference)). On the other hand, FIG. 4B illustrates the situation in which, for example, the relay station RN is a mobile relay station RN implemented in a vehicle etc., and a mobile station UE is used in the same vehicle. In this situation, the vehicle itself functions as a shielding plate. Therefore, although the relay station RN transmits data to the mobile station UE in the duration of the DL backhaul (DL_BH subframe), the transmission signal is blocked by the shielding plate, and there is low interference with the signal from the base station. In the situation in which there is a small self-interference amount of the relay station RN, the self-interference can be canceled by the relay station RN. The technique of detecting a desired signal (the received signal from the base station eNB in the example in FIGS. 4A and 4B) by removing the interference component from the received signal, that is, the technique of canceling the self-interference, is well known. Such a technique is described in, for example, the Japanese Laid-open Patent Publication No. 2007-274390.

Configuring a backhaul even in the situation in which the relay station can cancel the self-interference is to limit in excess the communication between the relay station and the mobile station in the backhaul period, which is not preferable because the throughput of the mobile communication system is degraded.

SUMMARY

According to an aspect of the embodiments, a communication duration configuring method is used in a mobile communication system with a relay station for relaying wireless communications between a base station and a mobile station. The method includes: configuring at least one of a downlink communication duration in which the relay station receives a transmission signal from the base station while limiting a transmission of a signal from the relay station to the mobile station, and an uplink communication duration in which the relay station transmits the transmission signal to the base station while limiting a transmission of a signal from the mobile station to the relay station; measuring a self-interference amount in the relay station; and controlling a configuration of the communication duration according to the self-interference amount.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a flowchart of the connection startup procedure of the relay station including the backhaul configuring method according to the third embodiment;

FIG. 15 is a flowchart of the connection startup procedure of the relay station including the backhaul configuring method according to the fourth embodiment;

FIG. 17 is a flowchart of the connection startup procedure of the relay station including the backhaul configuring method according to the sixth embodiment;

FIGS. 18-19 are explanatory views of the method of measuring the self-interference amount by the relay station according to the seventh embodiment;

FIG. 23 is a flowchart of an operation of the relay station according to the eighth embodiment.

DESCRIPTION OF EMBODIMENTS

Figure 1:
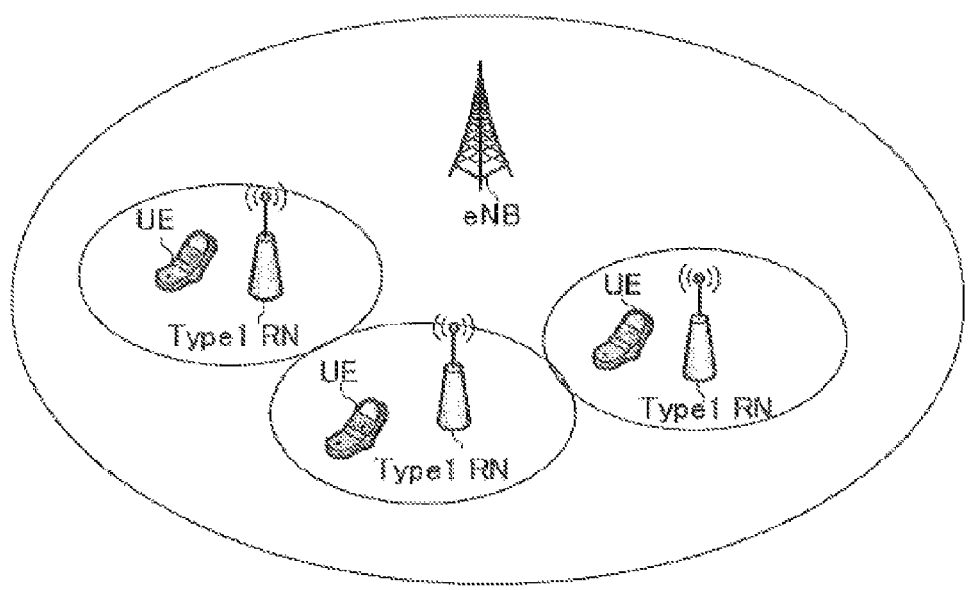
FIG. 1 illustrates a configuration of the mobile communication system including a relay station for supporting the communication between a base station and a mobile station.
Figure 2:
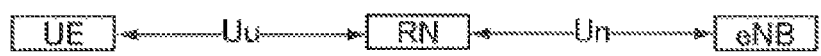
FIG. 2 illustrates a link configuration among the base station, the relay station and the mobile station.
Figure 3:
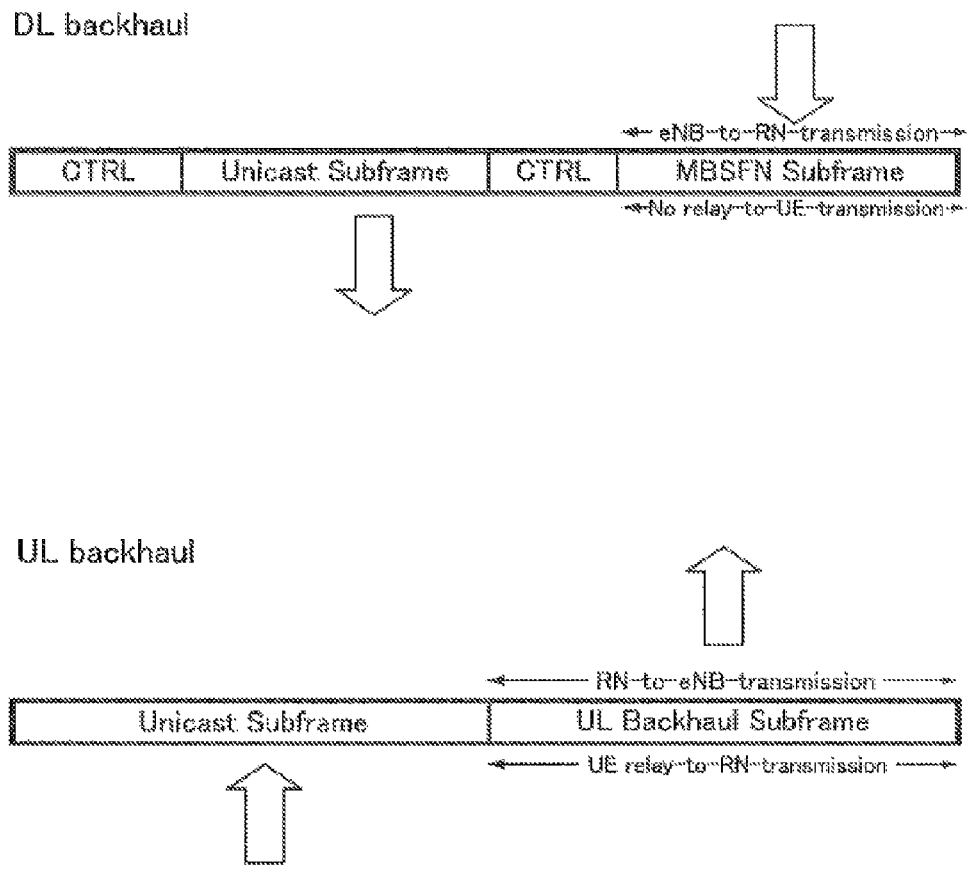
FIG. 3 illustrates the configuration policy of a backhaul.
Figure 4:
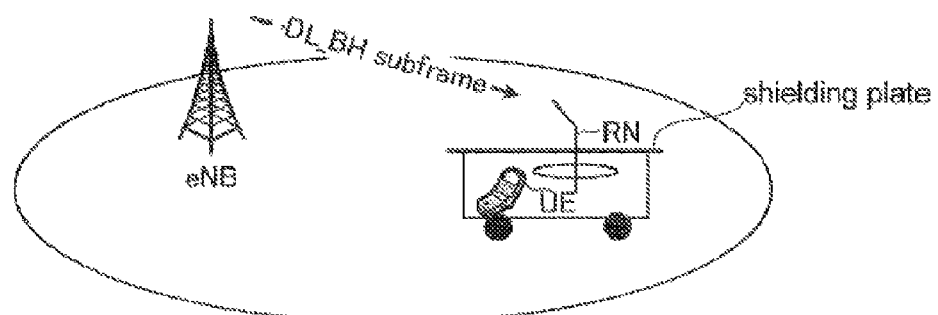
FIGS. 4A and 4B illustrate the situations in which the self-interference of the relay station can be canceled.

Described below is a plurality of embodiments of the present invention. In the following description, a base station is called eNB, a relay station is called RN, and a mobile station is called UE. The base station eNB according to the embodiments is a donor base station (donor eNB or DeNB) for supporting the backhaul link with the relay station RN. A station which receives data and a station which transmits data are respectively referred to as a source node and a destination node, respectively.

In the following description, a "backhaul duration" refers to one or more durations in a plurality of durations configured in a TTI (transmission time interval) unit in a single radio frame. In the embodiments, the TTI is a time period in a subframe (1 ms) unit. "Configuring a backhaul" may refer to configuring or designating a backhaul as a subframe in a radio frame. Note that the embodiments may be applied also to a situation where the TTI is not the time in a subframe unit.

(1) First Embodiment (1-1) Mobile Communication System

In the mobile communication system according to the embodiment, the relay station RN has a self-interference mitigation function (or loop interference mitigation function) described in, for example, the Japanese Laid-open Patent Publication No. 2007-274390 etc. With the self-interference mitigation function, in the downlink for example, the loop interference component of a transmission signal directed to the mobile station UE is mitigated or canceled from a received signal, and a downlink signal (desired signal) from the base station eNB is detected. In the following description, the loop interference component (or its signal power) is referred to as a "self-interference amount". When the self-interference amount is large, a distortion of a signal waveform occurs by, for example, the saturation of received power, thereby degrading the detection characteristic of the desired signal. Therefore, for the self-interference mitigation function, it is preferable that the self-interference amount is less than or equal to a specified reference value. In each of the following embodiments, the maximum value of the self-interference amount (hereafter referred to as a "reference value") for a normal operation of the self-interference mitigation function, which is obtained by a prior measurement, is known information with respect to the relay station RN and the base station eNB.

In the mobile communication system according to the embodiment, the relay station RN measures the self-interference amount of the relay station RN before connecting to a network. When the measured self-interference amount is small enough so that the relay station RN can cancel its self-interference, that is, when the self-interference amount of the relay station RN is equal to or less than the reference value, no backhaul is configured between the base station eNB and the relay station RN in order to obtain a normal operation of the self-interference mitigation function. That is, when the self-interference amount of the relay station RN is equal to or less than the reference value, the self-interference is canceled or mitigated by the self-interference mitigation function of the relay station RN. Therefore, it is not necessary to configure backhaul to mitigate the self-interference. Accordingly, when the self-interference amount of the relay station RN is equal to or less than the reference value, the wireless communication between the relay station RN and the mobile station UE is not limited in the backhaul duration, thereby improving the throughput of the mobile communication system.

In the mobile communication system according to the embodiment, the process of measuring the self-interference amount in the relay station RN, the process of determining whether or not the backhaul is configured based on the measurement result, and the process of determining the backhaul duration (position of a subframe in one radio frame) are performed in the procedure of the connection of the relay station RN to the network. The procedure of the connection of the relay station RN for the LTE-A is described in the non-patent document 3.

(1-2) Connection Startup Procedure of Relay Station RN in the LTE

Figure 5:
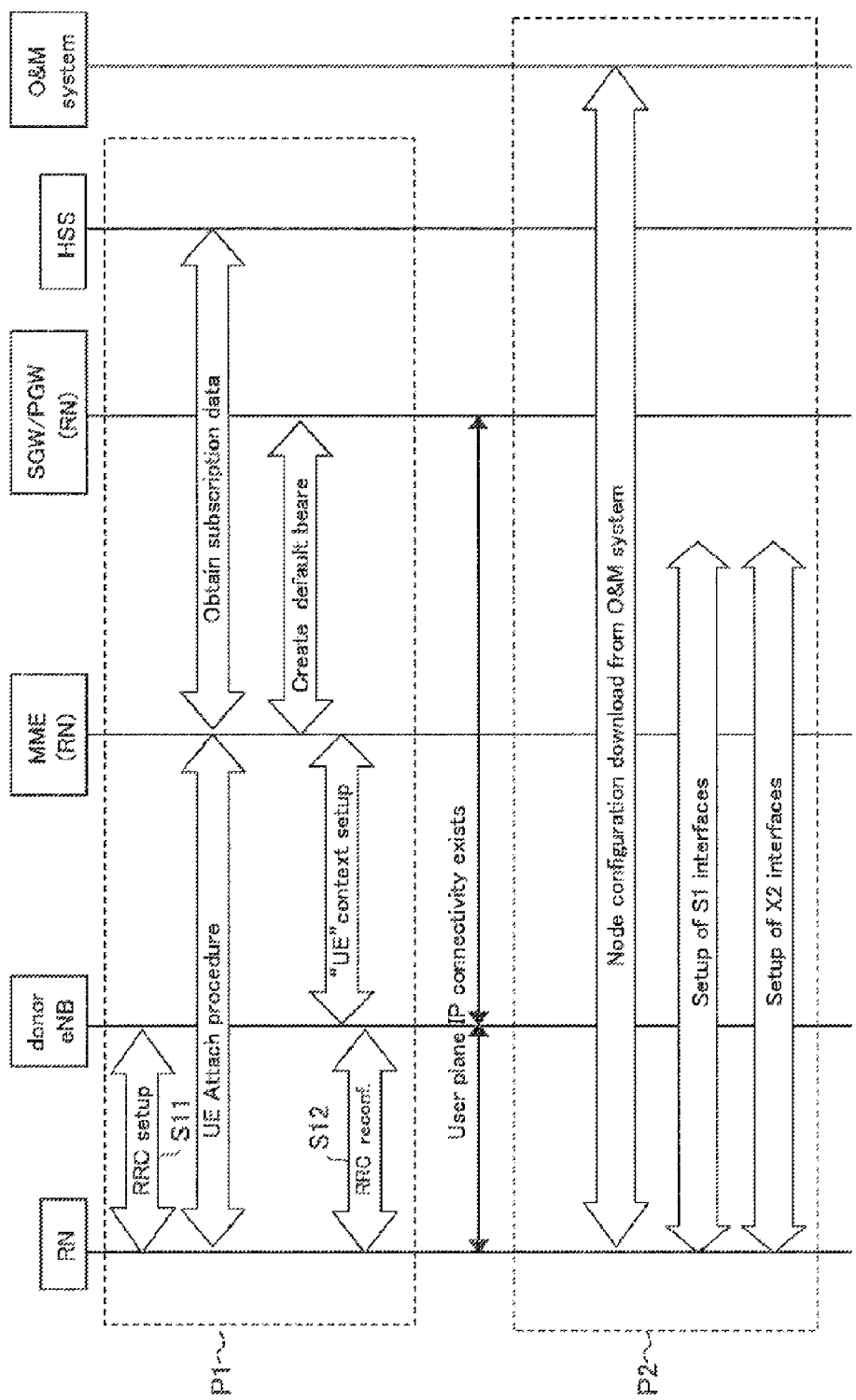
FIGS. 5-7 are flowcharts of the connection startup procedure of the relay station RN in the mobile communication system.
Figure 6:
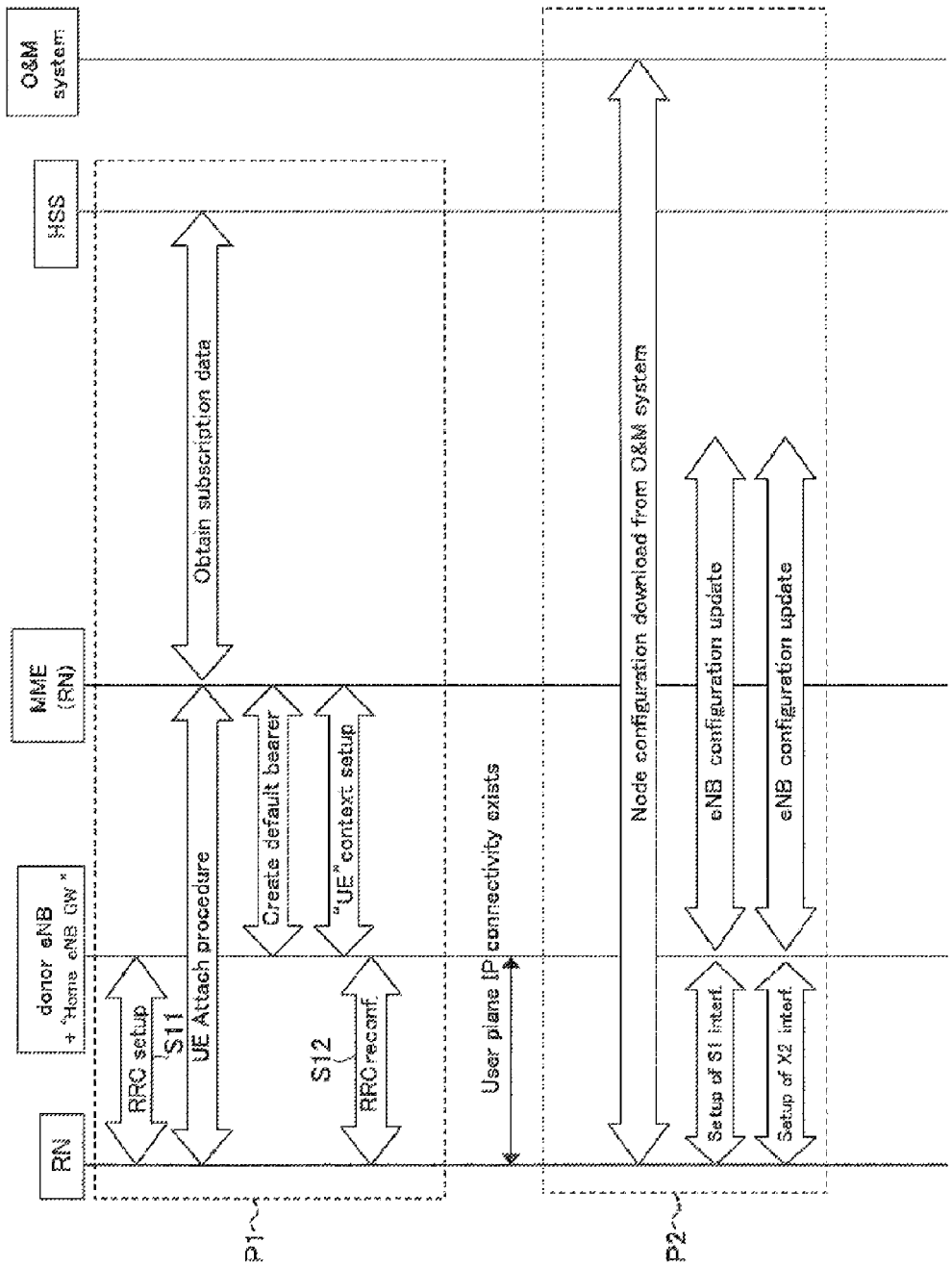
Figure 7:
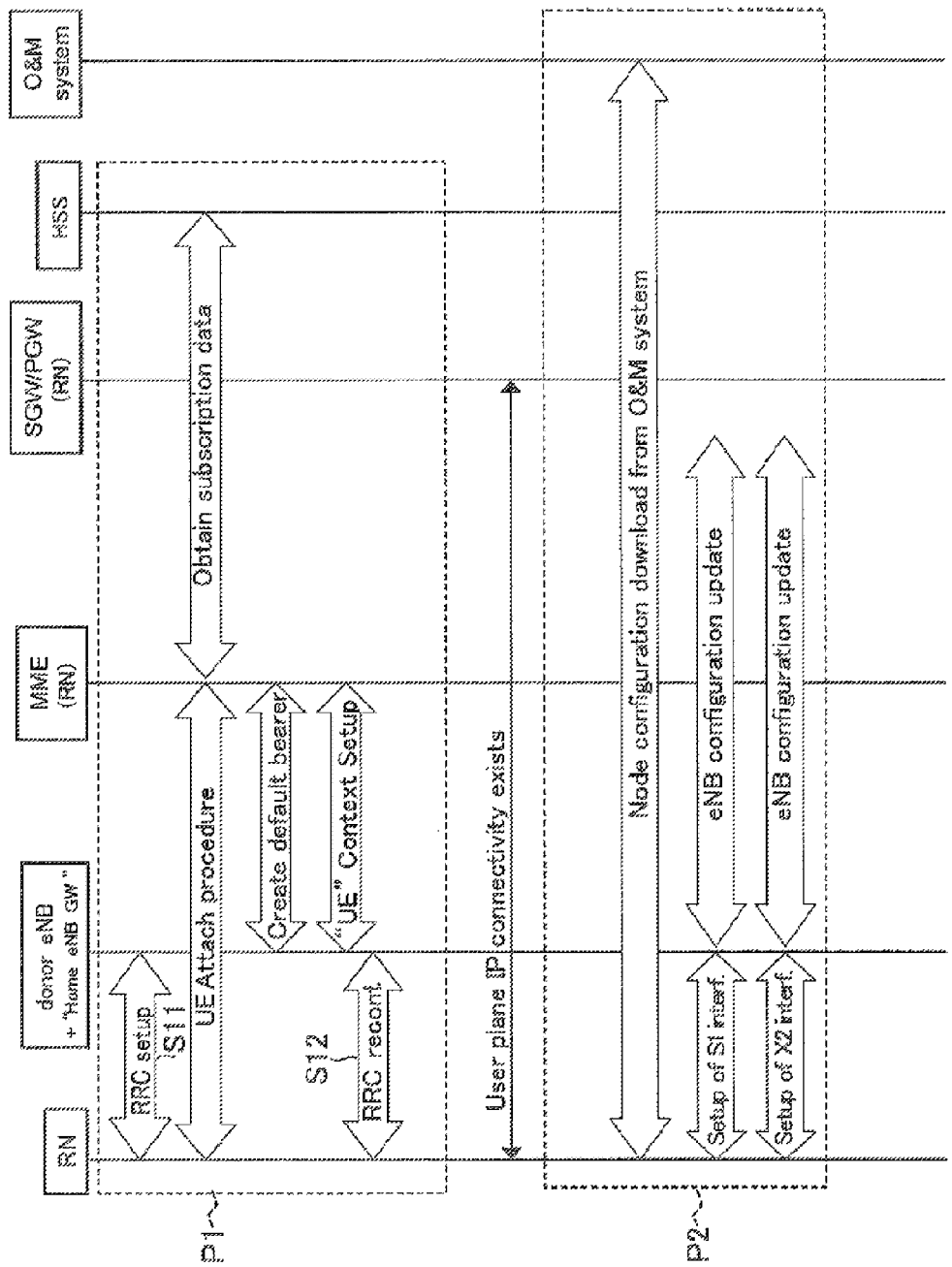

FIGS. 5 through 7 are flowcharts of the connection startup procedure of the relay station RN in the mobile communication system, which is described in the non-patent document 3 (such as "RN startup procedure" in the document). In each of FIGS. 5 through 7, in procedure P1, the relay station RN attaches to the network by the attach procedure of the legacy mobile station UE (mobile station UE for the LTE), authenticates the mobile station UE, and establishes the basic connectivity. When the IP connectivity is established, in procedure P2, the O&M system (operation and maintenance system) downloads the configuration data to the relay station RN, the relay station RN establishes a required S1/X2 interface, and enters a normal operation state.

Figure 8:
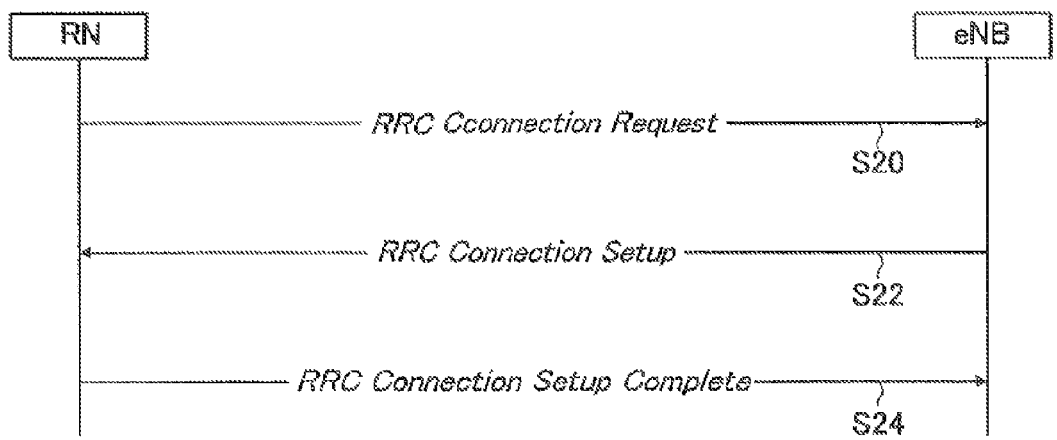
FIG. 8 is a flowchart of the RRC setup procedure.
Figure 9:
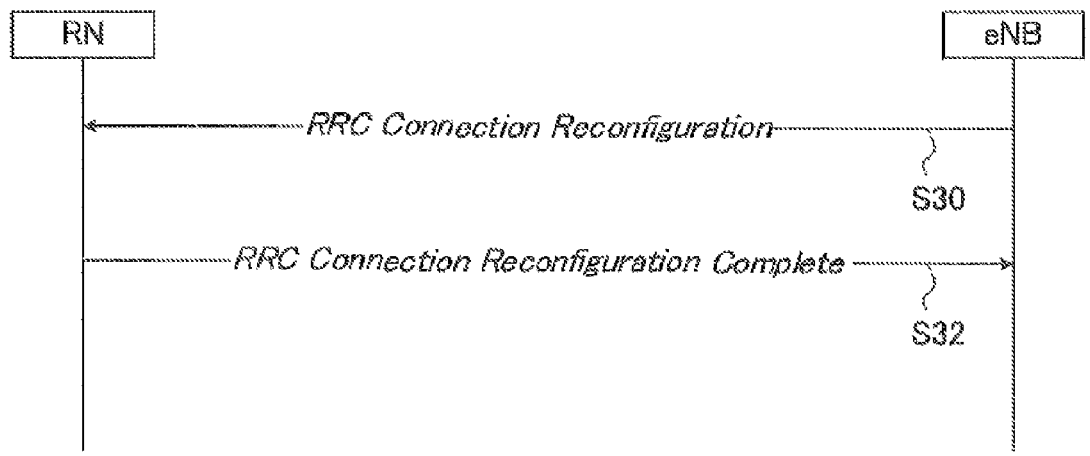
FIGS. 9-10 are flowcharts of the RRC reconfiguration procedure.
Figure 10:

The detailed flowchart of the RRC setup procedure ("RRC setup") in step S11 of the procedure P1 is illustrated in FIG. 8, and the detailed flowchart of the RRC reconfiguration procedure ("RRC reconf.") in step S12 of the procedure P1 is illustrated in FIGS. 9 and 10.

In the RRC setup procedure in FIG. 8, the relay station RN transmits an RRC connection request message ("RRC Connection Request") to the base station eNB to establish RRC (radio resource control) (step S20). In response to the message, the base station eNB transmits an RRC connection setup message ("RRC Connection Setup") to the relay station RN (step S22). Then, the relay station RN transmits an RRC connection setup completion message ("RRC Connection Setup Complete") to the base station eNB, and an RRC connection is established (step S24).

In the RRC reconfiguration procedure in FIG. 9, the base station eNB transmits an RRC connection reconfiguration message ("RRC Connection Reconfiguration") to the relay station RN (step S30). In response to the message, the relay station RN transmits an RRC connection reconfiguration completion message ("RRC Connection Reconfiguration Complete") to the base station eNB (step S32). As another scheme of the RRC reconfiguration procedure, a request from the relay station RN triggers the start of a process. That is, as illustrated in FIG. 10, the relay station RN first transmits an RRC connection reconfiguration request message ("RRC Connection Reconfiguration Request") to the base station eNB (step S40). In response to the message, the base station eNB transmits the RRC connection reconfiguration message ("RRC Connection Reconfiguration") to the relay station RN (step S42). Then, the relay station RN transmits the RRC connection reconfiguration completion message ("RRC Connection Reconfiguration Complete") to the base station eNB (step S44).

(1-3) Connection Startup Procedure of the Relay Station RN in the Embodiment

Figure 11:
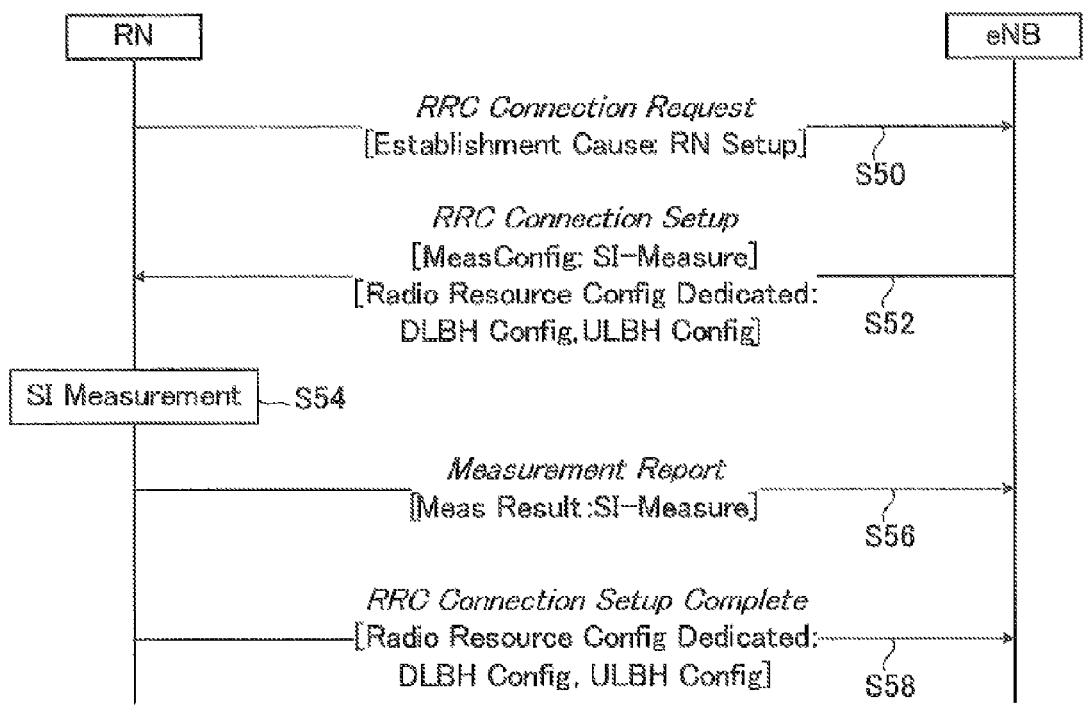
FIG. 11 is a flowchart of the RRC setup procedure of the relay station including the backhaul configuring method according to the first embodiment.

Described next is the connection startup procedure of the relay station RN in the embodiment. In the connection startup procedure of the relay station RN in the embodiment, the RRC setup procedure is different from that illustrated in FIG. 8. FIG. 11 is a flowchart of the RRC setup procedure of the relay station RN according to the first embodiment. The flowchart in FIG. 11 includes a step to implement the backhaul configuring method according to the embodiment.

In the RRC setup procedure in FIG. 11, the relay station RN transmits the RRC connection request message ("RRC Connection Request") to the base station eNB to establish the RRC connection (step S50). In response to the message, the base station eNB transmits the RRC connection setup message ("RRC Connection Setup") to the relay station RN (step S52).

The "Radio Resource Config Dedicated", which is an IE (information element) included in the RRC connection configuring message, is obtained by extending what the LTE by adding "DLBH Config" and "ULBH Config" as the data indicating the candidates (candidate durations) of the downlink backhaul and the uplink backhaul respectively. In this case, the base station eNB determines the candidate duration of the downlink backhaul and the uplink backhaul while considering the scheduling of the base station eNB, and notifies the relay station RN of the candidate duration.

In order to specify the position (or timing) of the subframe (1 ms) in the radio frame (10 ms) as the candidate durations of the downlink backhaul and the uplink backhaul, "DLBH Config" and "ULBH Config" can be 10 bit data corresponding to the position of each subframe in order, respectively. For example, when one radio frame is sequentially configured by 10 subframes #0 through #9, "DLBH Config" is to be "0110000000" in order to configure the subframes #1 and #2 in the candidate duration of the downlink backhaul, and "ULBH Config" is to be "0000010100" in order to configure the subframes #5 and #7 in the candidate duration of the uplink backhaul. In this case, the bit position within the 10-bit data ("DLBH Config" and "ULBH Config") corresponds to each of the subframes #0 through #9. Furthermore, "Meas Config", which is an information element included in the RRC connection configuring message, is obtained by extending the LTE by adding data "SI-Measure" indicating the instruction to measure the self-interference amount of the relay station RN from the base station eNB to the relay station RN.

With the communication specification of the LTE taken into account, the amount of data of "DLBH Config" and "ULBH Config" can be reduced. That is, in the downlink of the LTE, the subframes #0, #4, #5, and #9 addressed to the mobile station UE are respectively defined for use by Primary SCH, Paging, Secondary SCH, and Paging. Therefore, these subframes cannot be configured in the downlink backhaul. Thus, since any of the remaining subframes #1, #2, #3, #6, #7, and #8 is the candidate duration of the downlink backhaul, "DLBH Config" can be represented by 3-bit data. In addition, in the LTE, an ACK/NACK signal is to be transmitted from the relay station RN in 4 ms after the transmission of downlink data to the relay station RN. Based on this sequence, if the uplink backhaul is configured after 4 ms (subsequent to 4 subframes) of the downlink backhaul, then the uplink backhaul is necessarily determined according to configurations of the downlink backhaul, thereby requiring no "ULBH Config".

Upon receipt of an instruction ("SI-Measure") to measure the self-interference amount of the relay station RN, the relay station RN measures the self-interference amount of the station ("SI-Measurement" in step S54). The relay station RN transmits a measurement report message ("Measurement Report") including the measured self-interference amount (step S56). "Meas Result", which is an information element included in the measurement report message, is obtained by extending the LTE by adding data "SI-Measure" to notify the base station eNB of the self-interference amount of the relay station RN measured by the relay station RN. The self-interference amount may be reported in [dB] or [dBm].

Finally, the relay station RN transmits the RRC connection setup completion message ("RRC Connection Setup Complete") to the base station eNB, thereby establishing the RRC connection (step S58). In this case, when the self-interference amount obtained in step S54 is larger than the reference value, the downlink backhaul and the uplink backhaul in the radio frame are configured. In the embodiment, "Radio Resource Config Dedicated", which is an information element included in the RRC connection setup completion message, is obtained by extending the LTE by adding "DLBH Config" and "ULBH Config" as data respectively indicating the downlink backhaul duration and uplink backhaul duration as determined by the relay station RN from among the candidate durations reported in step S52. "DLBH Config" and "ULBH Config" can be configured as in step S52. For example, in order to configure the downlink backhaul in the second subframe, "DLBH Config" is to be "0100000000".

On the other hand, when the self-interference amount obtained in step S54 is equal to or less than the reference value, the relay station RN uses "0000000000" for a specific code indicating that no backhaul is configured for "DLBH Config" and/or "ULBH Config" in step S58. Thus, the base station eNB recognizes that the relay station RN can cancel the self-interference, and no backhaul is configured between the base station eNB and the relay station RN. Otherwise, the base station can be notified without configuring "DLBH Config" and "ULBH Config". That is, the RRC connection setup completion message is transmitted without including these information elements ("DLBH Config" and "ULBH Config"). Upon receipt of the message and detection of no information element included, the base station eNB implicitly assumes that the relay station RN does not configure the backhaul.

(1-4) Format of Radio Frame Addressed to Relay Station RN

After the completion of the RRC setup procedure of the relay station RN (after step S58), the base station eNB can adjust the format of a radio frame. That is, the base station eNB may change the format of the radio frame to the relay station RN depending on whether or not the self-interference mitigation function of the relay station RN can cancel the self-interference amount of the relay station RN (that is, larger than the reference value). That is, the format of the radio frame to the relay station RN may be changed depending on whether or not the backhaul between the base station eNB and the relay station RN has been configured. The change of the format of the radio frame is described below with reference to FIG. 12.

Figure 12A:
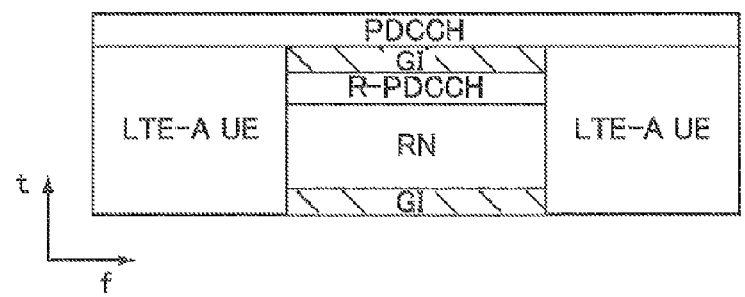
FIGS. 12A and 12B illustrate the format of a radio frame according to the first embodiment.
Figure 12B:
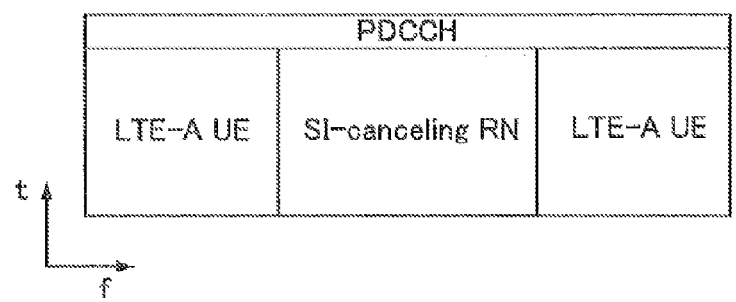

FIGS. 12A and 12B illustrate the format of the radio frame which can be changed depending on whether or not the backhaul has been configured. FIG. 12A illustrates an example of radio frame format in the case of configuring the backhaul, and FIG. 12B illustrates an example on the case of not configuring the backhaul. In the formats in FIGS. 12A and 12B, the vertical axis indicates time while the horizontal axis indicates a carrier frequency. The formats in FIGS. 12A and 12B include a carrier for the mobile station UE (LTE-A UE) for the LTE-A and a carrier for the relay station RN.

The backhaul is configured for a radio frame in the base station eNB when the self-interference amount measured by the relay station RN is larger than the reference value. In this case, the base station eNB adds a GI (guard interval) to the radio frame format for the relay station RN as illustrated in FIG. 12A. The radio frame format for the relay station RN includes the portion of transmitting a control signal (described as R-PDCCH in FIG. 12) and the portion of transmitting user data (described as RN in FIG. 12). On the other hand, no backhaul is configured in the radio frame in the base station eNB when the self-interference amount measured in the base station eNB is equal to or less than the reference value. In this case, since the relay station RN can cancel the self-interference, the base station eNB does not add an GI (guard interval) to the radio frame format for the relay station RN (SI-canceling RN) as illustrated in FIG. 12B. That is, the radio frame format for the relay station RN is substantially the same as that for the mobile station UE. When the GI is not added to the radio frame for the relay station RN, a data signal can be mapped in the area corresponding to the GI. Therefore, the throughput of the wireless communication through the relay station RN is improved.

As described above, in the mobile communication system according to the first embodiment, the relay station RN measures the self-interference amount, and it is determined whether the backhaul between the base station eNB and the relay station RN is to be configured depending on the measurement result. If the self-interference amount of the relay station RN is equal to or less than the reference value, the self-interference is canceled by the self-interference mitigation function of the relay station RN. Therefore, it is not necessary to configure the backhaul for mitigating the self-interference. Accordingly, when the self-interference amount of the relay station RN is equal to or less than the reference value, the wireless communication between the relay station RN and the mobile station UE is not limited in the backhaul duration, thereby improving the throughput of the mobile communication system. Furthermore, the throughput can be further improved if a radio frame is generated without configuring a GI (guard interval) to the relay station.

After the base station eNB and the relay station RN start the data communication by the backhaul, it is preferable that the base station eNB adjusts the transmission power to the relay station RN depending on the self-interference amount of the relay station RN. For example, when the self-interference amount of the relay station RN is relatively small, the base station eNB reduces the transmission power to the relay station RN, and when the self-interference amount of the relay station RN is relatively large, the base station eNB increases the transmission power to the relay station RN. When the self-interference amount of the relay station RN is small, the relay station RN can cancel the self-interference. Therefore, the base station eNB can reduce the power consumption by reducing the transmission power to the relay station RN. When the self-interference amount of the relay station RN is large, the base station eNB increases the transmission power to the relay station RN, thereby increasing the reception SNR (signal to noise ratio) in the relay station RN. Thus, the detection capability of a desired signal (signal from the base station eNB) is improved in the relay station RN.

(2) Second Embodiment

The RRC setup procedure of the relay station RN including the backhaul configuring method according to the second embodiment is described with reference to FIG. 13. The backhaul configuring method according to the second embodiment is different from the method according to the first embodiment (FIG. 11) in that the relay station RN spontaneously measures the self-interference amount prior to the RRC setup procedure of the relay station RN, and that the relay station RN positively determines the backhaul duration.

Figure 13:
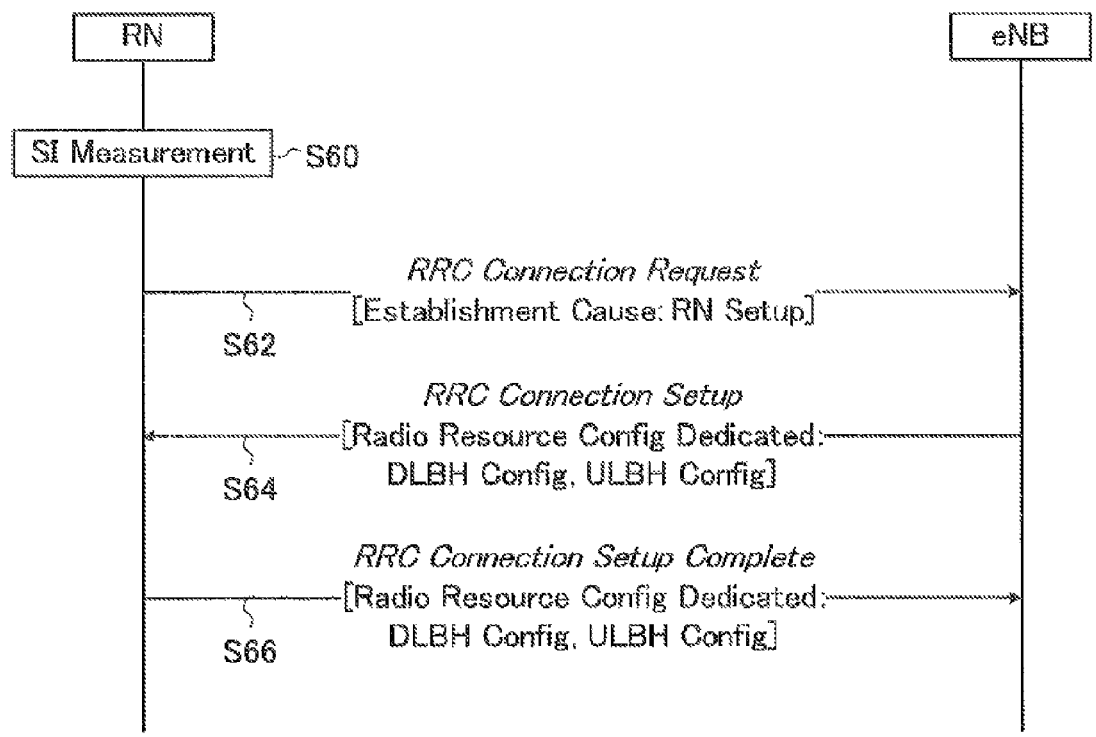
FIG. 13 is a flowchart of the RRC setup procedure of the relay station including the backhaul configuring method according to the second embodiment.

That is, as illustrated in FIG. 13, the relay station RN measures the self-interference amount (step S60). In the mobile communication system including the LTE, the permission to transmit an uplink signal by the relay station RN cannot be issued from the base station eNB before the RRC setup procedure of the relay station RN. Therefore, before the RRC setup procedure of the relay station RN, when the self-interference against an uplink signal is measured, it is preferable that the signal pattern of the signal (for example, an SRS signal) to be transmitted to the base station eNB for the measurement of the self-interference amount by the relay station RN, and the radio resources used for the signal are determined in advance between the relay station RN and the base station eNB.

Upon completion of the measurement of the self-interference amount, the relay station RN transmits the RRC connection request message ("RRC Connection Request") to the base station eNB to establish an RRC connection (step S62). In response to the message, the base station eNB transmits the RRC connection setup message ("RRC Connection Setup") to the relay station RN (step S64).

"Radio Resource Config Dedicated", which is an IE (information element) included in the RRC connection setup message, is obtained by extending the LTE by adding "DLBH Config" and "ULBH Config" as the data respectively indicating the candidates of the durations (candidate durations) of the downlink backhaul and the uplink backhaul. In this case, the base station eNB determines the candidate durations of the downlink backhaul and the uplink backhaul while considering the scheduling in the base station eNB, and notifies the relay station RN of the candidate durations. The data configuration of "DLBH Config" and "ULBH Config" are exemplified in the first embodiment.

Finally, the relay station RN transmits the RRC connection setup completion message ("RRC Connection Setup Complete") to the base station eNB and the RRC connection is established (step S66). "Radio Resource Config Dedicated", which is an information element included in the RRC connection setup completion message, is obtained by extending the LTE by adding "DLBH Config" and "ULBH Config" respectively as the data indicating the durations of the downlink backhaul and the uplink backhaul determined by the relay station RN from among the candidate durations notified in step S64. Note that steps S62, S64, and S66 in FIG. 13 are substantially the same as steps S50, S52, and S58 in FIG. 11.

In the backhaul configuring method according to the second embodiment, the durations of the downlink backhaul and the uplink backhaul can be configured by changing the RRC setup procedure of the relay station RN of the LTE as in the first embodiment described above. As with the first embodiment, the presence/absence of the configuration of the backhaul is determined depending on the measurement result of the self-interference amount of the relay station RN.

(3) Third Embodiment

The connection startup procedure of the relay station RN including the backhaul configuring method according to the third embodiment is described below with reference to FIG. 14. In the connection startup procedure, unlike the first and second embodiments, the backhaul is configured in the RRC reconfiguration procedure.

In FIG. 14, the RRC setup procedure (steps S70 through S74) is substantially the same as the procedure of the LTE (steps S20 through S24 in FIG. 8). The RRC reconfiguration procedure after the RRC setup procedure corresponds to the flowchart in FIG. 9, but some steps are added to implement the backhaul configuring method according to the third embodiment.

First, the base station eNB transmits the RRC connection reconfiguration message ("RRC Connection Reconfiguration") to the relay station RN (step S76). In this message, "Radio Resource Config Dedicated", which is an information element included in the RRC connection reconfiguration message, is obtained by extending the LTE by adding "DLBH Config" and "ULBH Config" as the data respectively indicating the candidates (candidate durations) of the durations of the downlink backhaul and the uplink backhaul. In this case, the base station eNB determines the candidate durations of the downlink backhaul and the uplink backhaul while considering the scheduling of the base station eNB, and notifies the relay station RN of the candidate durations. The data configuration of "DLBH Config" and "ULBH Config" is exemplified in the first embodiment. Furthermore, "Meas Config", which is an information element included in the RRC connection reconfiguration message, is obtained by extending the LTE by adding the data "SI-Measure" indicating the instruction to measure the self-interference amount of the relay station RN from the base station eNB to the relay station RN.

In response to the instruction ("SI-Measure") to measure the self-interference amount of the relay station RN, the relay station RN measures the self-interference amount of the relay station ("SI-Measurement" in step S78). The relay station RN transmits the measurement report message ("Measurement Report") including the measured self-interference amount (step S80). "Meas Result", which is an information element included in the measurement report message, is obtained by extending the LTE by adding the data "SI-Measure" to report the self-interference amount of the local station measured by the relay station RN to the base station eNB. The self-interference amount may be reported in [dB] or [dBm].

Finally, the relay station RN transmits the RRC connection reconfiguration completion message ("RRC Connection Reconfiguration Complete") to the base station eNB (step S82). "Radio Resource Config Dedicated", which is an information element included in the RRC connection reconfiguration completion message, is obtained by extending the LTE by adding "DLBH Config" and "ULBH Config" respectively as the data indicating the durations of the downlink backhaul and the uplink backhaul determined by the relay station RN from among the candidate durations notified in step S76.

In the backhaul configuring method according to the third embodiment as described above, the durations of the downlink backhaul and the uplink backhaul can be configured by changing the RRC reconfiguration procedure of the relay station RN of the LTE. The presence/absence of the configuration of the backhaul is determined depending on the measurement result of the self-interference amount of the relay station RN as in the first embodiment.

(4) Fourth Embodiment

The connection startup procedure of the relay station RN including the backhaul configuring method according to the fourth embodiment is described below with reference to FIG. 15. In the connection startup procedure, only the RRC reconfiguration procedure is different from the method (FIG. 14) according to the third embodiment. That is, the backhaul configuring method according to the fourth embodiment is different from the method according to the third embodiment in that the relay station RN spontaneously measures the self-interference amount before the RRC setup procedure of the relay station RN, and that the relay station RN positively determines the backhaul.

In the RRC reconfiguration procedure illustrated in FIG. 15, the base station eNB transmits the RRC connection reconfiguration message ("RRC Connection Reconfiguration") to the relay station RN (step S90). In this case, the procedure is different from step S76 in FIG. 14 in that "SI-Measure" indicating the instruction to measure the self-interference amount of the relay station RN is not included in the message from the base station eNB to the relay station RN. The relay station RN spontaneously measures the self-interference amount of the relay station without an instruction from the base station eNB ("SI-Measure" in step S92).

Upon completion of the measurement of the self-interference amount, the relay station RN transmits the RRC connection reconfiguration completion message ("RRC Connection Reconfiguration Complete") to the base station eNB (step S94). "Radio Resource Config Dedicated", which is an information element included in the RRC connection reconfiguration completion message, is obtained by extending the LTE by adding "DLBH Config" and "ULBH Config" respectively as the data indicating the durations of the DL backhaul and the UL backhaul determined by the relay station RN from among the candidate durations notified in step S90.

In the backhaul configuring method according to the fourth embodiment as described above, the downlink backhaul and the uplink backhaul can be configured by changing the RRC reconfiguration procedure of the relay station RN of the LTE. The presence/absence of the configuration of the backhaul is determined depending on the measurement result of the self-interference amount of the relay station RN as in the first embodiment. In the backhaul configuring method according to the fourth embodiment, the step of the relay station RN measuring the self-interference amount can be performed before the RRC setup procedure as in the second embodiment (FIG. 13).

(5) Fifth Embodiment

The connection startup procedure of the relay station RN including the backhaul configuring method according to the fifth embodiment is described below with reference to FIG. 16. In the connection startup procedure, the RRC reconfiguration procedure is different from the method according to the third embodiment (FIG. 14). That is, in the backhaul configuring method according to the fifth embodiment, as compared with the method according to the third embodiment (FIG. 14), the base station eNB does not notify candidates of the relay station RN for a backhaul duration (candidate duration), but specifies the backhaul duration.

Figure 16:
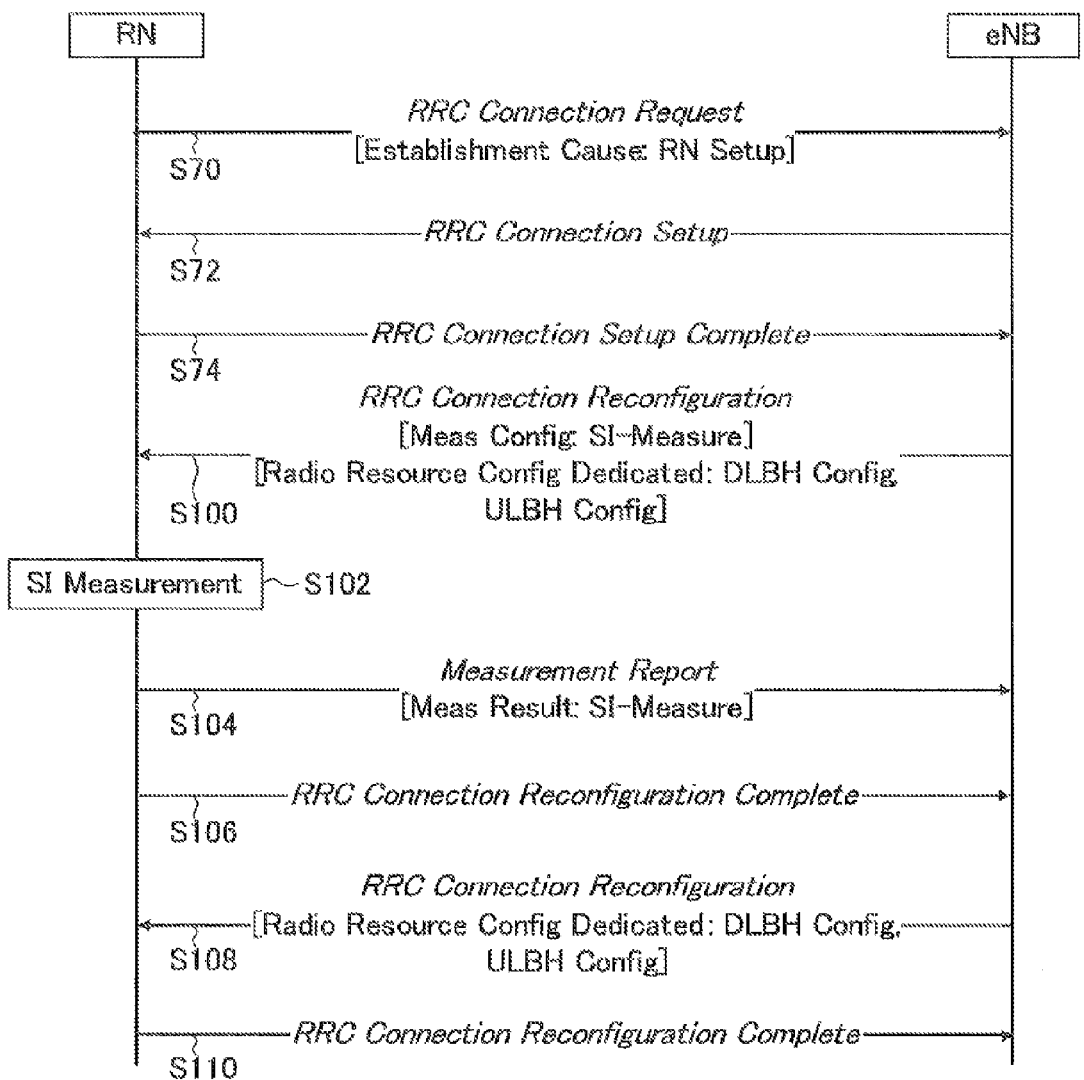
FIG. 16 is a flowchart of the connection startup procedure of the relay station including the backhaul configuring method according to the fifth embodiment.

In the RRC reconfiguration procedure illustrated in FIG. 16, the base station eNB transmits the RRC connection reconfiguration message ("RRC Connection Reconfiguration") to the relay station RN (step S100). In this case, the procedure is different from step S76 in FIG. 14 in that "DLBH Config" and "ULBH Config" are described as the data respectively indicating the DL backhaul and the UL backhaul. That is, unlike the case in FIG. 14, "DLBH Config" and "ULBH Config" notified in step S100 do not represent candidate durations for a backhaul. According to "DLBH Config" and "ULBH Config" notified in step S100, the relay station RN configures a backhaul between the relay station RN and the base station eNB.

"Meas Config", which is an information element included in the RRC connection reconfiguration message in step S100, includes "SI-Measure" indicating the instruction to measure the self-interference amount of the relay station RN. Therefore, the relay station RN measures the self-interference amount of the local station upon receiving the message ("SI-Measurement" in step S102).

Upon completion of the measurement of the self-interference amount, the relay station RN transmits a measurement report message ("Measurement Report") including the self-interference amount to the base station eNB (step S104). Furthermore, the relay station RN transmits the RRC connection reconfiguration completion message ("RRC Connection Reconfiguration Complete") to the base station eNB (step S106).

The base station eNB determines whether or not the backhaul between the base station eNB and the relay station RN is to be configured based on the self-interference amount of the relay station RN included in the measurement report message received in step S104. When the self-interference amount of the relay station RN is larger than the reference value, and the base station eNB determines that the self-interference cannot be canceled in the relay station RN, it is not necessary to perform the processes in and after step S108 in FIG. 16 because the backhaul duration has been reported to the relay station RN in step S100. When it is determined that the self-interference amount of the relay station RN is small and the self-interference can be canceled in the relay station RN, the base station eNB transmits again the RRC connection reconfiguration message ("RRC Connection Reconfiguration") to the relay station RN (step S108). In this case, the base station eNB sets each of "DLBH Config" and "ULBH Config" included in the RRC connection reconfiguration message to, for example, 10 bit data of "0000000000" as a specific code indicating that no backhaul is to be configured. Upon receipt of the values of "DLBH Config" and "ULBH Config", the relay station RN does not configure the backhaul between the relay station RN and the base station eNB. Finally, the relay station RN transmits again the RRC connection reconfiguration completion message ("RRC Connection Reconfiguration Complete") to the base station eNB (step S110). Steps S104 and S106 can be executed in the reverse order. That is, after executing step S106, step S104 can be executed.

In the backhaul configuring method according to the fifth embodiment, the durations of the downlink backhaul and the uplink backhaul can be configured by changing the RRC reconfiguration procedure of the relay station RN of the LTE as described above.

(6) Sixth Embodiment

The connection startup procedure of the relay station RN including the backhaul configuring method according to the sixth embodiment is described below with reference to FIG. 17. In the connection startup procedure, the RRC reconfiguration procedure is different from the method according to the fifth embodiment (FIG. 16). That is, in the backhaul configuring method according to the sixth embodiment, as compared with the method according to the fifth embodiment (FIG. 16), the method according to the sixth embodiment is different in that the relay station RN spontaneously measures the self-interference amount, and that the relay station RN requests the base station eNB to release the backhaul when the self-interference amount is equal to or less than the reference value.

In the RRC reconfiguration procedure illustrated in FIG. 17, the base station eNB transmits the RRC connection reconfiguration message ("RRC Connection Reconfiguration") to the relay station RN (step S120). In this case, the procedure is different from step S100 in FIG. 16 in that no "SI-Measure" indicating the instruction to measure the self-interference amount of the relay station RN is included in the message from the base station eNB to the relay station RN. Therefore, the relay station RN spontaneously measures the self-interference amount of the relay station RN without receiving the instruction ("SI-Measurement" in step S122).

Upon completion of the measurement of the self-interference amount, the relay station RN transmits the RRC connection reconfiguration completion message ("RRC Connection Reconfiguration Complete") to the base station eNB (step S124). When the self-interference amount measured in step S122 is equal to or less than the reference value, the relay station RN determines that it is not necessary to configure the backhaul, and requests the base station eNB to release the backhaul. To issue the request, the relay station RN transmits the RRC connection reconfiguration request message ("RRC Connection Reconfiguration Request") to the base station eNB (step S126). The transmitted RRC connection configuration message is obtained by extending the LTE by adding the "release BH Config" to request the release of the backhaul.

At the request of the backhaul release in step S126, the base station eNB transmits again the RRC connection reconfiguration message ("RRC Connection Reconfiguration") (step S128). In this case, the base station eNB sets each of "DLBH Config" and "ULBH Config" included in the RRC connection reconfiguration message to, for example, 10 bit data of "0000000000" as a specific code indicating that no backhaul is to be configured. Upon receipt of the values of "DLBH Config" and "ULBH Config", the relay station RN confirms that the request for the backhaul release has been accepted. Finally, the relay station RN transmits again the RRC connection reconfiguration completion message ("RRC Connection Reconfiguration Complete") to the base station eNB (step S130).

In the backhaul configuring method according to the sixth embodiment, the durations of the downlink backhaul and the uplink backhaul can be configured by changing the RRC setup procedure of the relay station RN of the LTE.

(7) Seventh Embodiment

Figure 18:
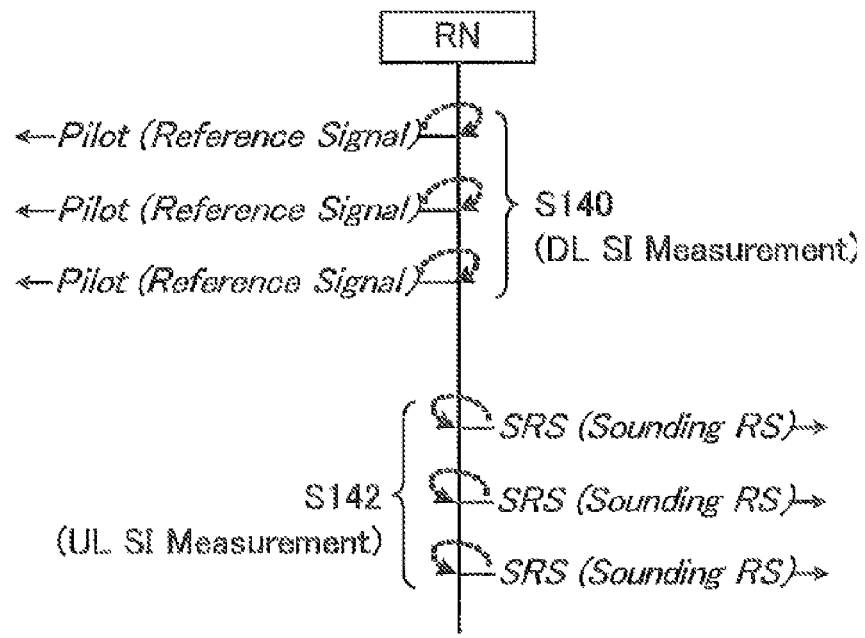

In the seventh embodiment, the method of measuring the self-interference amount performed by the relay station RN according to each of the first through sixth embodiments is described below with reference to FIGS. 18 and 19. FIGS. 18 and 19 are explanatory views of the method of measuring the self-interference amount by the relay station RN.

In the method illustrated in FIG. 18, the relay station RN measures ("DL SI Measurement") the downlink self-interference amount based on the pilot signal (Pilot) as a reference signal (Reference Signal) to be transmitted to the mobile station UE (step S140). In the measurement of the downlink self-interference amount, the signal component (indicated by the dotted line in FIG. 18) looped to a transceiver for the base station eNB is measured in the transmission signals to the mobile station UE. In addition, the relay station RN measures ("UL SI Measurement") the uplink self-interference amount based on an SRS signal (Sounding RS) to be transmitted to the base station eNB (step S142). In the measurement of the uplink self-interference amount, the signal component (indicated by the dotted line in FIG. 18) looped to a transceiver for the mobile station UE is measured in the transmission signals to the base station eNB. Since the levels of the pilot signal and the SRS signal fluctuate depending on the radio environment between the base station eNB and the relay station RN, it is preferable that a statistical process (for example, averaging) is performed on a plurality of samples in a specified period (measurement value of self-interference amount).

In the measuring method illustrated in FIG. 19, after the base station eNB transmits the RRC connection reconfiguration message ("RRC Connection Reconfiguration") (for example, after step S30 in FIG. 9) to the relay station RN, the relay station RN measures the self-interference amount using the reference signal. In this case, the "SI-Measure", which is an information element included in the RRC connection reconfiguration message, includes the data of "BaseSigPattern" and "BaseSigTiming". "BaseSigPattern" indicates a signal pattern (specified bit sequence) of the reference signal prepared in advance between the base station eNB and the relay station RN. "BaseSigTiming" indicates the transmission timing (for example, the timing in a subframe unit) of the reference signal determined in advance between the base station eNB and the relay station RN. In FIG. 19, the base station eNB transmits RN of "BaseSigPattern" and "BaseSigTiming" to the relay station RN in step S150 using the RRC connection reconfiguration message ("RRC Connection Reconfiguration"), and then the downlink self-interference amount is measured.

The reference signal ("DL BaseSig") of a specified pattern based on the data notified in step S150 is transmitted from the base station eNB to the relay station RN with a specified transmission timing (T1, T2, . . . , Tn). The relay station RN transmits the reference signal of the specified pattern based on the notified data via a transceiver for the mobile station UE with the specified transmission timing (T1, T2, . . . , Tn). Then, the relay station RN acquires the downlink self-interference amount by measuring the power (DL_M1, DL M2, . . . , DL_Mn) of the signal looped to the transceiver on the base station eNB side of the relay station RN (step S152).

The relay station RN further measures the uplink self-interference amount after measuring the downlink self-interference amount. That is, the relay station RN transmits the reference signal of the specified pattern based on the data notified in step S150 via the transceiver for the base station eNB with the specified transmission timing (T1, T2, . . . , Tn). Then, the relay station RN acquires the uplink self-interference amount by measuring the power (UL M1, ULM2, . . . , UL Mn) of the signal looped to the transceiver on the mobile station UE side of the relay station RN (step S154).

In the method of measuring the self-interference amount illustrated in FIG. 19, the reference signal can be an SRS signal. Generally, unless the radio resources and the transmission timing of the SRS signal are notified from the base station eNB to the relay station RN, the relay station RN cannot transmit the SRS signal. Therefore, when the reference signal is an SRS signal, it is preferable that the self-interference amount is measured immediately after the RRC setup procedure in step S11 of the procedure P1 in FIGS. 5 through 7.

However, the signal pattern of the specified SRS signal and the radio resources used for the SRS signal can be specified in advance as a test pattern between the base station eNB and the relay station RN. Thus, the measurement of the self-interference amount can be started with a specified timing based on the test pattern although the radio resources the transmission timing for the SRS signal are not reported from the base station eNB to the relay station RN.

(8) Eighth Embodiment

According to the eighth embodiment, practical examples of the base station eNB and the relay station RN in the first through seventh embodiments are described.

(8-1) Configuration of the Base Station eNB and the Relay Station RN

Figure 20:
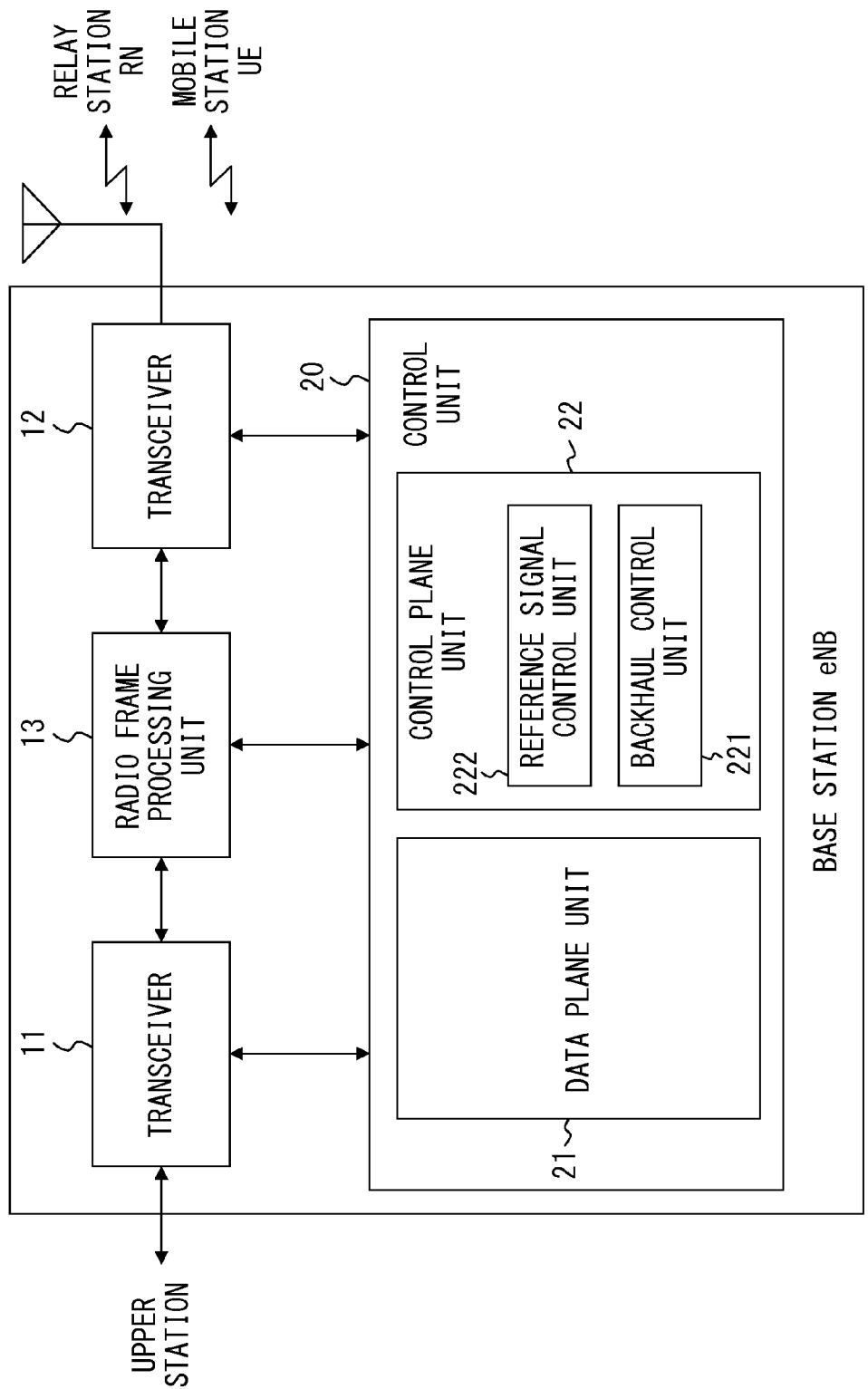
FIG. 20 is a block diagram of an example of the configuration of the base station according to the eighth embodiment.
Figure 21:
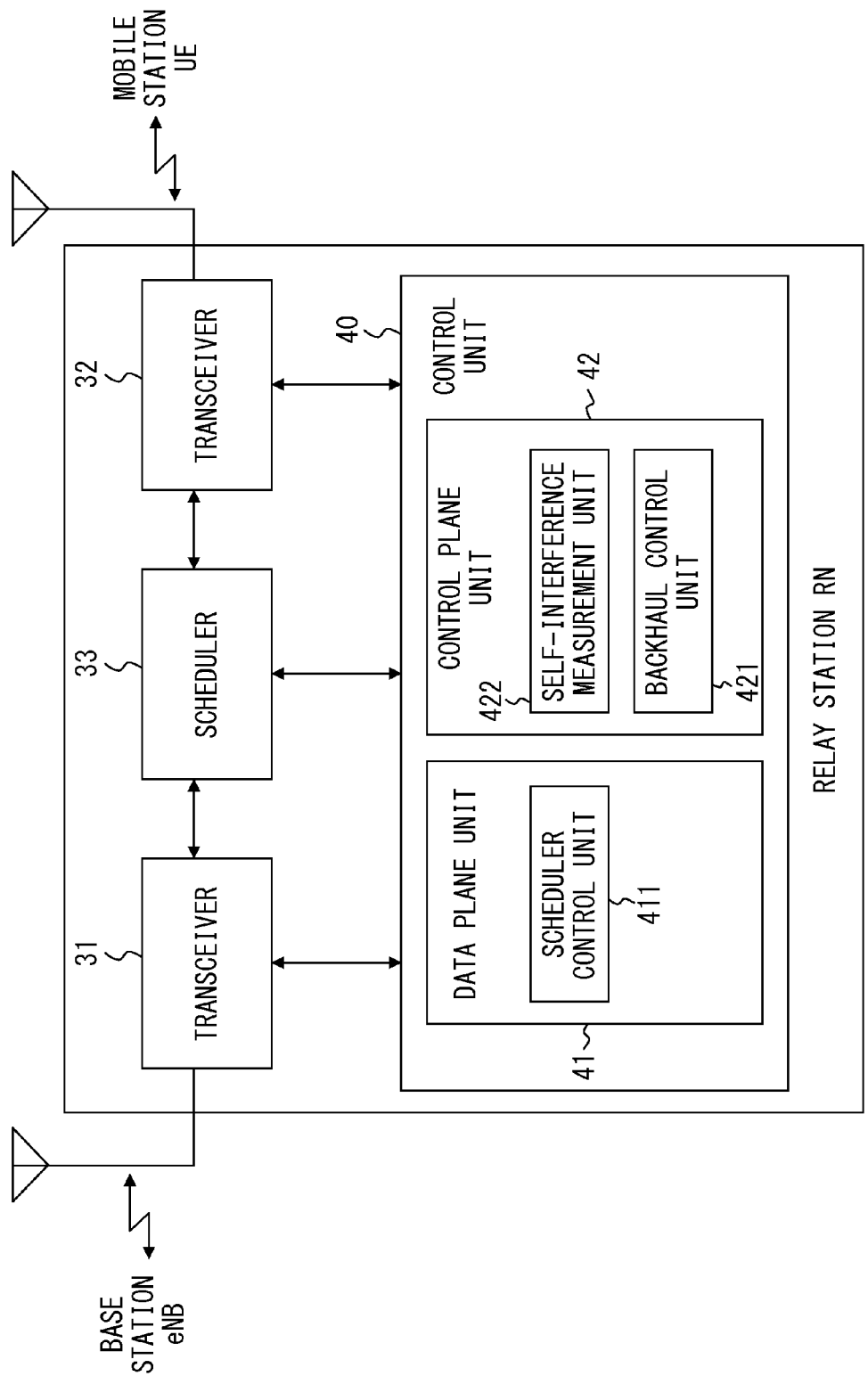
FIG. 21 is a block diagram of an example of the configuration of the relay station according to the eighth embodiment.

First, the configurations of the base station eNB and the relay station RN are described with reference to FIGS. 20 and 21. FIGS. 20 and 21 are block diagrams of the configurations of the base station eNB and the relay station RN, respectively. Although the configuration of the mobile station UE is not illustrated, the mobile station UE includes a transceiver for transmitting and receiving a signal to and from the relay station RN depending on the backhaul configured between the base station eNB and the relay station RN.

As illustrated in FIG. 20, the base station eNB includes transceivers 11 and 12, a radio frame processing unit 13, and a control unit 20. The control unit 20 includes a data plane unit 21, a control plane unit 22 including a backhaul control unit 221 and a reference signal control unit 222.

The transceiver 11 performs the transmission and reception process with other base stations performed according to the X2 protocol, and the transmission and reception process with an upper station such as an MME (mobility management entity) etc. performed according to the S1 protocol. The transceiver 12 performs the transmission and reception process with the relay station RN and the mobile station UE. For example, when a downlink radio frame is transmitted in OFDM, the transceiver 12 converts the radio frame generated by the radio frame processing unit 13 into a time domain signal for each subcarrier (IFFT process), combines the time domain signals, and performs a CP (cyclic prefix) adding process, etc.

The data plane unit 21 of the control unit 20 performs protocol processing on a data plane signal with an upper station or another base station, relay station RN, and mobile station UE, and performs scheduling (process of allocating radio resources) in a resource block unit for each relay station RN and mobile station UE.

The control plane unit 22 of the control unit 20 performs the protocol process of a control plane signal with an upper station or another base station, relay station RN, and mobile station UE. The reference signal control unit 222 decides a signal pattern and its transmission timing of a reference signal (for example, a pilot signal, an SRS signal, etc.) used in measuring a self-interference amount in the relay station RN.

The backhaul control unit 221 controls the configuration of backhaul with the relay station RN. The backhaul control unit 221, for example, configures a backhaul duration or a candidate duration, and releases a backhaul according to a message from the relay station RN, etc. The backhaul control unit 221 configures backhaul based on the self-interference amount of the relay station RN notified from the relay station RN when the base station eNB configures the backhaul duration. That is, when the backhaul control unit 221 determines that the self-interference amount measured by the relay station RN is equal to or less than the reference value, the backhaul control unit 221 does not configure the backhaul with the relay station RN. When the backhaul control unit 221 determines that the self-interference amount measured by the relay station RN is equal to or higher than the reference value, the backhaul control unit 221 configures the backhaul in a radio frame.

In the scheduling in the data plane unit 21, the backhaul configured by the backhaul control unit 221 is considered. The radio frame processing unit 13 generates a radio frame for the relay station RN and the mobile station UE based on the scheduling result of the data plane unit 21. The format of the radio frame generated by the radio frame processing unit 13 can be different depending on whether or not the backhaul is configured. That is, as illustrated in FIGS. 12A-12B, when the backhaul is configured, GI is added to the radio frame for the relay station RN, and when the backhaul is not configured, no GI is added to the radio frame for the relay station RN.

As illustrated in FIG. 21, the relay station RN according to the embodiments relays the wireless communication between the base station eNB and the mobile station UE. The relay station RN includes transceivers 31 and 32, a scheduler 33, and a control unit 40. The control unit 40 includes a data plane unit 41 including a scheduler control unit 411, and a control plane unit 42 including a backhaul control unit 421 and a self-interference measurement unit 422. The relay station RN according to the embodiments includes for each receiving system a self-interference mitigation function (not illustrated in FIG. 21) of effectively operating when the self-interference amount is equal to or less than the reference value.

The transceiver 31 performs the transmission and reception process with the base station eNB. The transceiver 32 performs the transmission and reception process with the mobile station UE. The relay station RN demodulates and decodes a received signal when the wireless communication is relayed between the base station eNB and the mobile station UE. Then, the data signal in the received signal which has been demodulated and decoded is scheduled and then transmitted to the destination node after encoded and modulated again. For example, when the downlink signal is transmitted in OFDM, the transceiver 32 demultiplexes the data signal with respect to subcarriers by FTT on the OFDM signal received from the base station eNB, and performs the demodulating and decoding process on the data signals. The data signals are encoded and modulated again, and mapped into a specified radio frame by the scheduler 33. The transceiver 31 performs a conversion of subcarrier signals into a time domain signal (IFFT process), combines the time domain signals, and performs a CP (cyclic prefix) adding process, etc.

The data plane unit 41 of the control unit 40 performs the protocol process on the data plane signal between the base station eNB and the mobile station UE. The scheduler control unit 411 performs scheduling in, for example, a resource block unit for each mobile station UE. The process of the scheduler 33 is performed based on the scheduling result of the scheduler control unit 411.

The control plane unit 42 of the control unit 40 performs the protocol process on the control plane signal between the base station eNB and the mobile station UE. For example, upon receipt of an instruction to measure the self-interference amount ("SI-Measure" described above) of the relay station RN from the base station eNB, the self-interference measurement unit 422 measures the self-interference amount. In this case, the signal pattern and the transmission timing of the reference signal (for example, the pilot signal, the SRS signal, etc.) used when the self-interference amount is measured are reported from, for example, the base station eNB as exemplified in FIG. 19.

The backhaul control unit 421 performs control for configuring of backhaul with the base station eNB. The backhaul control unit 421 for example configures the backhaul with the base station eNB, determines a candidate duration from among the backhaul candidate durations of the backhaul notified from the base station eNB, configures the backhaul based on the specification of the backhaul by the relay station RN, requests to release the backhaul, etc. In addition, when the relay station RN configures the backhaul, the backhaul control unit 421 configures the backhaul based on the self-interference amount measured by the self-interference measurement unit 422. That is, when the backhaul control unit 421 determines that the self-interference amount measured by the self-interference measurement unit 422 is equal to or less than the reference value, the backhaul control unit 421 configures no backhaul with the base station eNB. On the other hand, the backhaul control unit 421 configures the backhaul in the radio frame when the backhaul control unit 421 determines that the self-interference amount measured by the self-interference measurement unit 422 is larger than the reference value.

The scheduler control unit 411 of the data plane unit 41 performs scheduling of each mobile station UE based on the backhaul configured by the backhaul control unit 421. The scheduler 33 maps the data signal addressed to each mobile station UE into the radio frame according to the scheduling result in the scheduler control unit 411.

(8-2) Operations of Base Station eNB and Relay Station RN

Figure 22:
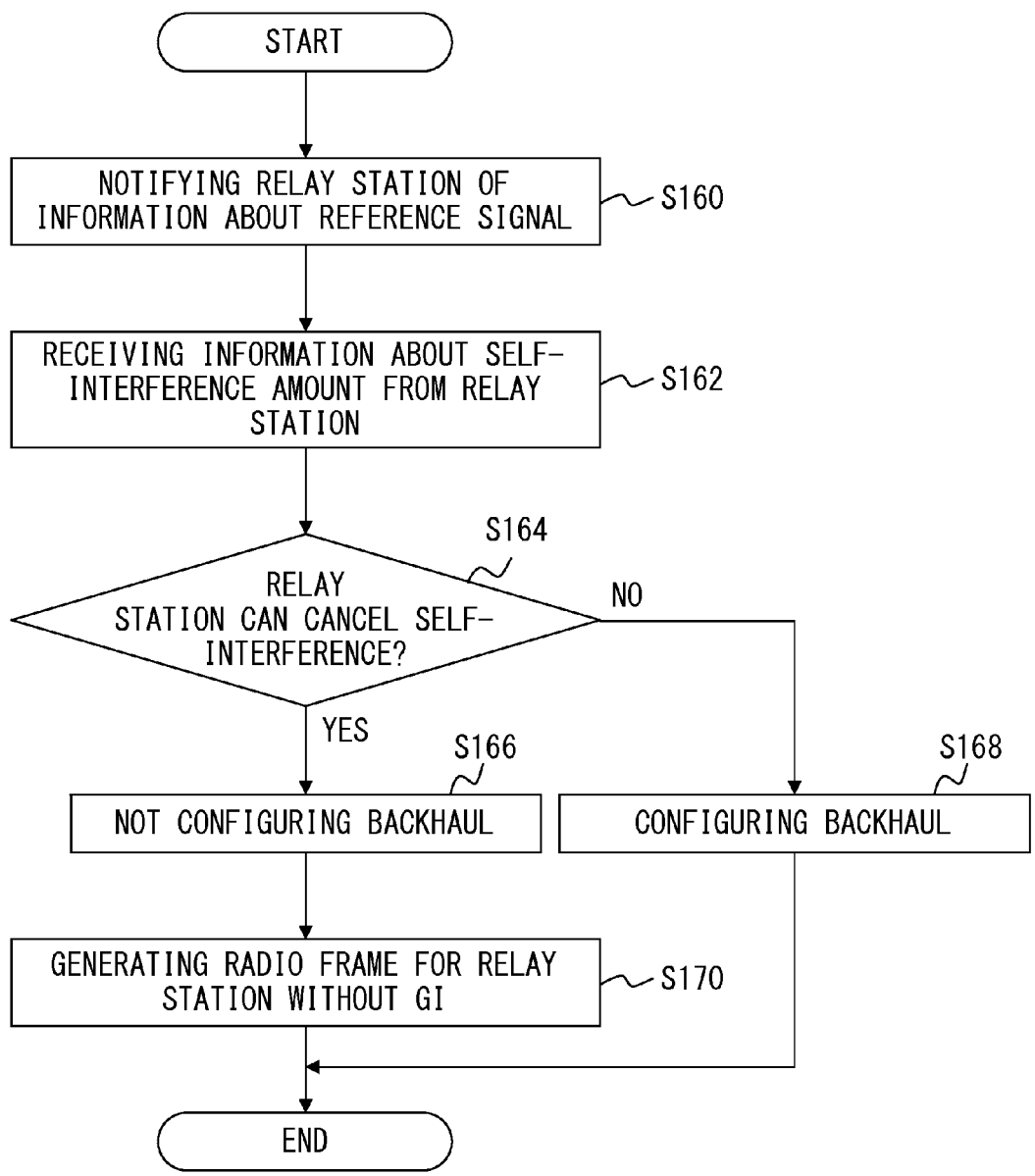
FIG. 22 is a flowchart of an operation of the base station according to the eighth embodiment.

Next, an example of an operation of the base station eNB and the relay station RN relating to the configuration of backhaul is described below with reference to FIGS. 22 and 23. FIGS. 22 and 23 are flowcharts of examples of the operations of the base station eNB and the relay station RN.

First, with reference to FIG. 22, the base station eNB notifies the relay station RN of the information (signal pattern and transmission timing) about the reference signal for measurement of the self-interference amount of the relay station RN (step S160). The base station eNB transmits, for example, the RRC connection reconfiguration message including the information about the reference signal to the relay station RN as illustrated in FIG. 19. Then, the information about the self-interference amount in the relay station RN is received in the format of, for example, the measurement report message (step S162). In the base station eNB, when the self-interference amount at the relay station RN is larger than the reference value, the backhaul control unit 221 determines that the self-interference cannot be canceled in the relay station RN (NO in step S164), and the backhaul with the relay station RN is configured (step S168).

On the other hand, when the self-interference amount from the relay station RN is equal to or less than the reference value, the backhaul control unit 221 determines that the self-interference can be canceled in the relay station RN (YES in step S164), and no backhaul is configured with the relay station RN (step S166). In this case, the radio frame processing unit 13 of the base station eNB generates the radio frame for the relay station RN without the GI (step S170).

Next, with reference to FIG. 23, the relay station RN receives from the base station eNB the information (signal pattern and transmission timing) about the reference signal for measurement of the self-interference amount of the relay station RN (step S180). The reception of the information about the reference signal triggers the measurement of the self-interference amount by the self-interference measurement unit 422 (step S182). In the relay station RN, when the self-interference amount measured in step S182 is larger than the reference value, the backhaul control unit 421 determines that the self-interference cannot be canceled (NO in step S184), and the backhaul with the base station eNB is configured (step S188).

On the other hand, when the self-interference amount measured in step S182 is equal to or less than the reference value, the backhaul control unit 421 determines that the self-interference can be canceled (YES in step S184), and no backhaul with the base station eNB is configured (step S186). In this case, the scheduler control unit 411 permits a simultaneous transmission and reception. That is, the scheduler control unit 411 permits the reception of a signal from the base station eNB simultaneously with the transmission of data to the mobile station UE, and permits the transmission of a signal to the base station eNB simultaneously with the reception of data from the mobile station UE. Upon receipt of the permission, the scheduler 33 performs simultaneous transmission and reception (step S190).

In steps S164 and 184, the base station eNB and the relay station RN separately configure the backhaul based on the measurement result of the self-interference amount in the relay station RN. However, as described above in some embodiments, one of the base station eNB and the relay station RN may determine the presence/absence of a backhaul configuration based on the self-interference amount measured by the relay station RN, and the other may accept the determination result.

The embodiments of the present invention are described above in detail, but the communication duration configuring method, relay station, base station, and mobile communication system according to the present invention are not limited to those described above, and may be varied and modified within the scope of the present invention.

In each embodiment, both the downlink backhaul and the uplink backhaul are configured. However, when it is assumed that the acknowledgment is returned within a specified time period (4 ms in the LTE) after the data transmission between the base station eNB and the relay station RN, the communication duration configuring method may configure only one of the downlink backhaul duration and the uplink backhaul duration.

According to the communication duration configuring method, the relay station, the base station, and the mobile communication system described in the embodiments, a communication duration is appropriately configured between the base station and the relay station. Accordingly, the throughput of the mobile communication system can be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A communication duration configuring method in a mobile communication system with a relay station for relaying wireless communications between a base station and a mobile station, the method comprising:

configuring a communication duration that is at least one of a downlink communication duration in which the relay station receives a transmission signal from the base station while limiting a transmission of a signal from the relay station to the mobile station, and an uplink communication duration in which the relay station transmits the transmission signal to the base station while limiting a transmission of a signal from the mobile station to the relay station;

measuring a self-interference amount in the relay station; and controlling a configuration of the communication duration, wherein the communication duration is configured by configuring, by the relay station, a subframe at a predetermined position in one radio frame when the self-interference amount is larger than a reference value, and a subframe is not configured in one radio frame when the self-interference amount is equal to or less than the reference value, and the reference value is determined according to a self-interference mitigation capability of the relay station.

2. The communication duration configuring method according to claim 1, further comprising:

notifying the relay station from the base station of candidate durations in which the communication duration can be configured; and notifying the base station from the relay station of a selection result of the communication duration selected from among the candidate durations.

3. The communication duration configuring method according to claim 1 further comprising:

transmitting an instruction to measure the self-interference amount from the base station to the relay station.

4. The communication duration configuring method according to claim 1, wherein a radio frame including a guard interval is transmitted from the base station to the relay station when the communication duration is configured, and a radio frame without the guard interval is transmitted from the base station to the relay station when the communication duration is not configured.

5. The communication duration configuring method according to claim 1, further comprising:

controlling transmission power of a downlink signal from the base station to the relay station according to the self-interference amount when a downlink transmission is performed from the base station to the relay station on the downlink communication duration.

6. A relay station which relays wireless communications between a base station and a mobile station, the relay station comprising:
- a first transceiver configured to transmit and receive a signal to and from the base station;
- a second transceiver configured to transmit and receive a signal to and from the mobile station;
- a measurement unit configured to measure a self-interference amount; and
- a controller which is able to configure a communication duration that is at least one of a downlink communication duration in which the relay station receives a transmission signal from the base station while limiting a transmission of a signal from the relay station to the mobile station, and an uplink communication duration in which the relay station transmits the transmission signal to the base station while limiting a transmission of a signal from the mobile station to the relay station, wherein
- the controller controls a configuration of the communication duration, wherein
- the controller configures the communication duration by configuring a subframe at a predetermined position in one radio frame when the self-interference amount is larger than a reference value, and a subframe is not configured in one radio frame when the self-interference amount is equal to or less than the reference value, and
- the reference value is determined according to a self-interference mitigation capability of the relay station.

7. The relay station according to claim 6, wherein the first transceiver receives from the base station a notification about candidate durations in which the communication duration can be configured, and notifies the base station of a selection result of the communication duration selected from among the candidate durations.

8. The relay station according to claim 6, wherein the first transceiver receives an instruction to measure the self-interference amount from the base station.

9. The relay station according to claim 6, wherein the first transceiver receives from the base station a radio frame including a guard interval when the communication duration is configured, and receives from the base station a radio frame without the guard interval when the communication duration is not configured.

10. The relay station according to claim 6, wherein the measurement unit measures the self-interference amount based on an instruction from the base station.

11. A mobile communication system with a relay station for relaying wireless communications between a base station and a mobile station, wherein
the relay station includes:
- a controller which is able to configure a communication duration that is at least one of a downlink communication duration in which the relay station receives a transmission signal from the base station while limiting a transmission of a signal from the relay station to the mobile station, and an uplink communication duration in which the relay station transmits the transmission signal to the base station while limiting a transmission of a signal from the mobile station to the relay station; and
- a measurement unit configured to measure a self-interference amount in the relay station, wherein the controller controls a configuration of the communication duration,
the base station includes a base station transceiver to transmit and receive a signal to and from the relay station based on the communication duration; and
the mobile station includes a mobile station transceiver to transmit and receive a signal to and from the relay station based on the communication duration, wherein
the controller configures the communication duration by configuring a subframe at a predetermined position in one radio frame when the self-interference amount is larger than a reference value, and a subframe is not configured in one radio frame when the self-interference amount is equal to or less than the reference value, and
the reference value is determined according to a self-interference mitigation capability of the relay station.

* * * * *